US008894017B1

(12) United States Patent
Baghdasarian

(10) Patent No.: US 8,894,017 B1
(45) Date of Patent: Nov. 25, 2014

(54) FLEXIBLE ARRAY SUPPORT STRUCTURE

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 46 days.

(21) Appl. No.: 13/729,848

(22) Filed: Dec. 28, 2012

(51) Int. Cl.
*B64G 1/44* (2006.01)
*H01L 31/042* (2014.01)
*H02S 30/20* (2014.01)

(52) U.S. Cl.
CPC .............. *H01L 31/045* (2013.01); *B64G 1/443* (2013.01)
USPC ...................... 244/172.7; 244/172.6; 136/245

(58) Field of Classification Search
USPC ............ 244/172.6, 172.7; 136/244, 245, 246, 136/251
See application file for complete search history.

(56) References Cited

U.S. PATENT DOCUMENTS

| | | | | |
|---|---|---|---|---|
| 3,735,942 | A * | 5/1973 | Palz | 244/172.7 |
| 3,735,943 | A * | 5/1973 | Fayet | 244/172.7 |
| 3,785,590 | A * | 1/1974 | Wentworth | 244/1 R |
| 3,817,481 | A * | 6/1974 | Berks et al. | 244/172.7 |
| 3,863,870 | A * | 2/1975 | Andrews et al. | 244/172.7 |
| 3,973,745 | A * | 8/1976 | Coltrin et al. | 244/172.6 |
| 4,630,791 | A * | 12/1986 | Chapman | 244/172.6 |
| 4,636,579 | A * | 1/1987 | Hanak et al. | 136/245 |
| 6,439,297 | B1 * | 8/2002 | Dunbar et al. | 165/46 |
| 6,547,190 | B1 | 4/2003 | Thompson et al. | |
| 6,609,683 | B2 | 8/2003 | Bauer et al. | |
| 6,637,702 | B1 * | 10/2003 | McCandless | 244/172.6 |
| 6,983,914 | B2 | 1/2006 | Stribling et al. | |
| 7,806,370 | B2 * | 10/2010 | Beidleman et al. | 244/172.7 |
| 8,061,660 | B2 | 11/2011 | Beidleman et al. | |
| 8,066,227 | B2 * | 11/2011 | Keller et al. | 244/172.7 |
| 8,109,472 | B1 | 2/2012 | Keller et al. | |
| 8,376,282 | B2 * | 2/2013 | Keller et al. | 244/172.7 |
| 8,387,921 | B2 * | 3/2013 | Taylor et al. | 244/172.7 |
| 8,393,581 | B2 * | 3/2013 | Keller et al. | 244/172.2 |
| 8,616,502 | B1 * | 12/2013 | Stribling et al. | 244/172.7 |
| 8,636,253 | B1 * | 1/2014 | Spence et al. | 244/172.8 |
| 8,683,755 | B1 * | 4/2014 | Spence et al. | 52/108 |
| 2002/0157326 | A1 | 10/2002 | Zwanenburg | |
| 2004/0016454 | A1 * | 1/2004 | Murphy et al. | 136/244 |
| 2005/0178921 | A1 * | 8/2005 | Stribling et al. | 244/173 |
| 2007/0262204 | A1 * | 11/2007 | Beidleman et al. | 244/172.6 |
| 2010/0187365 | A1 * | 7/2010 | Kutter et al. | 244/171.7 |

(Continued)

OTHER PUBLICATIONS

NASA—Advanced Solar Array Systems, Page Last Updated Oct. 31, 2012, 2 pages, http://www.nasa.gov/offices/oct/home/feature_sas.html.

*Primary Examiner* — Benjamin P Lee
(74) *Attorney, Agent, or Firm* — Weaver Austin Villeneuve & Sampson

(57) ABSTRACT

Extensible solar arrays configured to support one or more rollable solar panel units and that feature yoke segments and array segments that are configured to be stowed with their long axes substantially parallel to a spacecraft's roll axis. The yoke segments and array segments may be transitioned to a deployed configuration where the yoke segments are substantially perpendicular to the position the yoke segments were in in the stowed configuration, and the array segments are substantially perpendicular to the yoke segments. Some implementations of the extensible solar arrays may also include a rigid solar panel supported by one of the yoke segments.

24 Claims, 36 Drawing Sheets

(56) References Cited

U.S. PATENT DOCUMENTS

| | | | |
|---|---|---|---|
| 2011/0192444 A1* | 8/2011 | Beidleman et al. | 136/245 |
| 2011/0204186 A1* | 8/2011 | Keller et al. | 244/172.6 |
| 2011/0210209 A1 | 9/2011 | Taylor et al. | |
| 2011/0297205 A1* | 12/2011 | Stevenson et al. | 136/245 |
| 2012/0090660 A1* | 4/2012 | Keller et al. | 136/245 |
| 2012/0091281 A1* | 4/2012 | Kutter et al. | 244/171.7 |
| 2012/0167943 A1* | 7/2012 | Blanchard et al. | 136/245 |

* cited by examiner

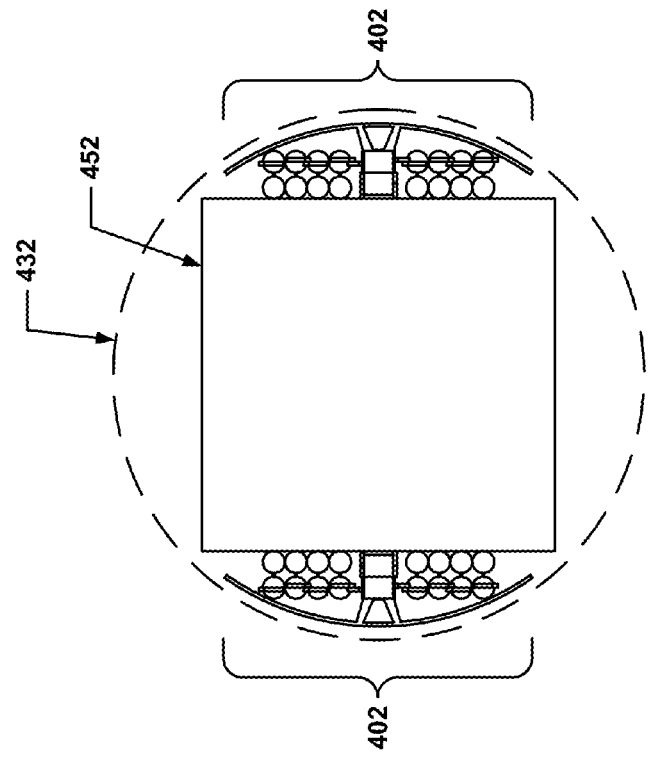
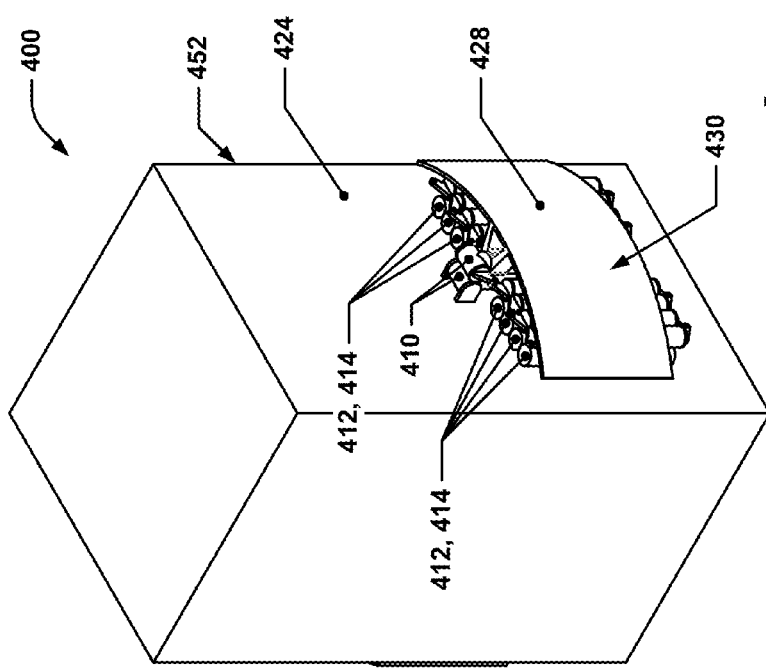
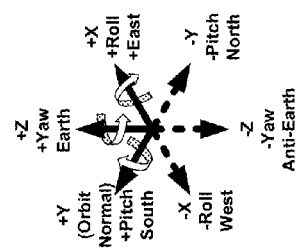
Figure 4B
Figure 4A

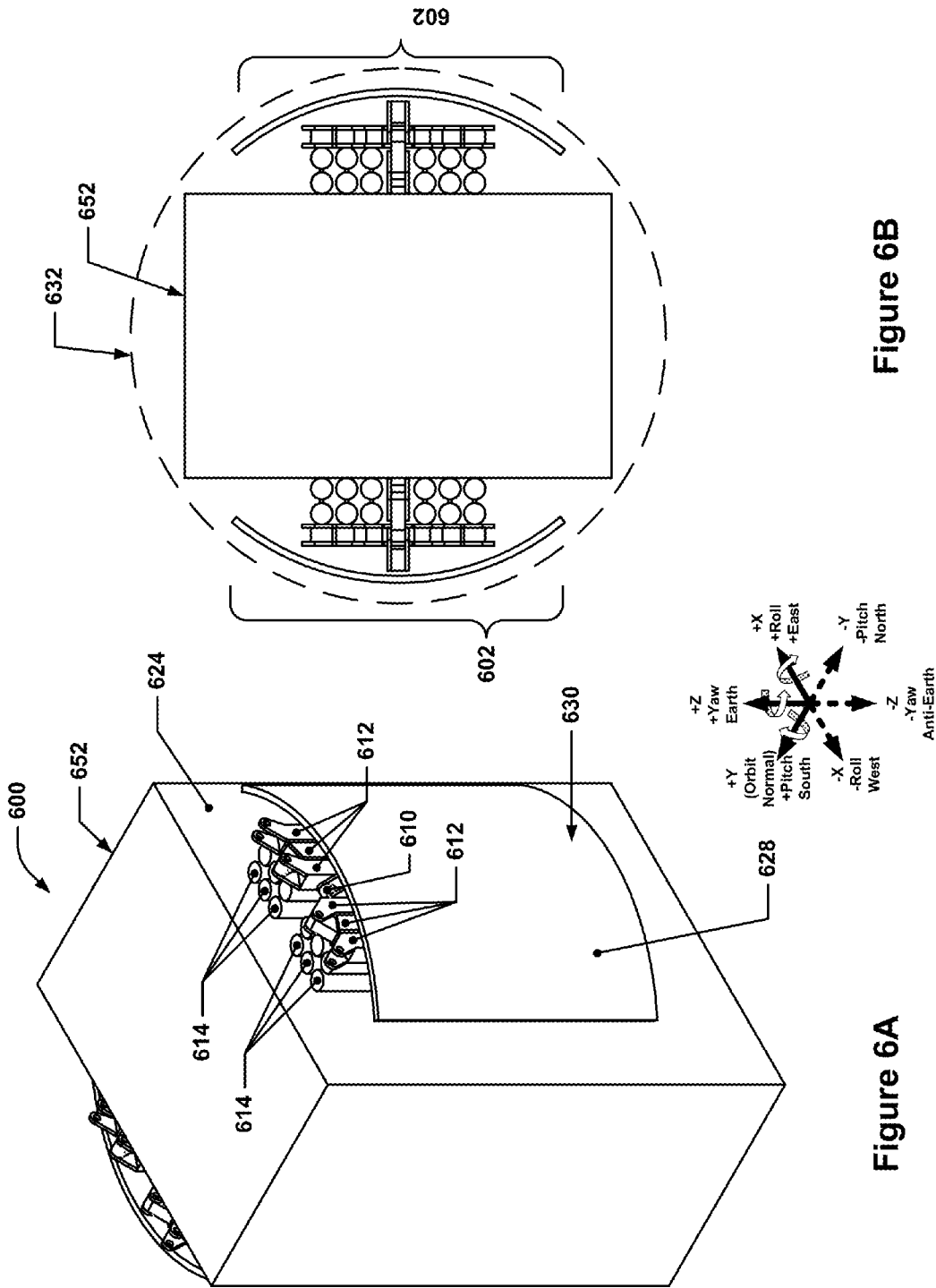

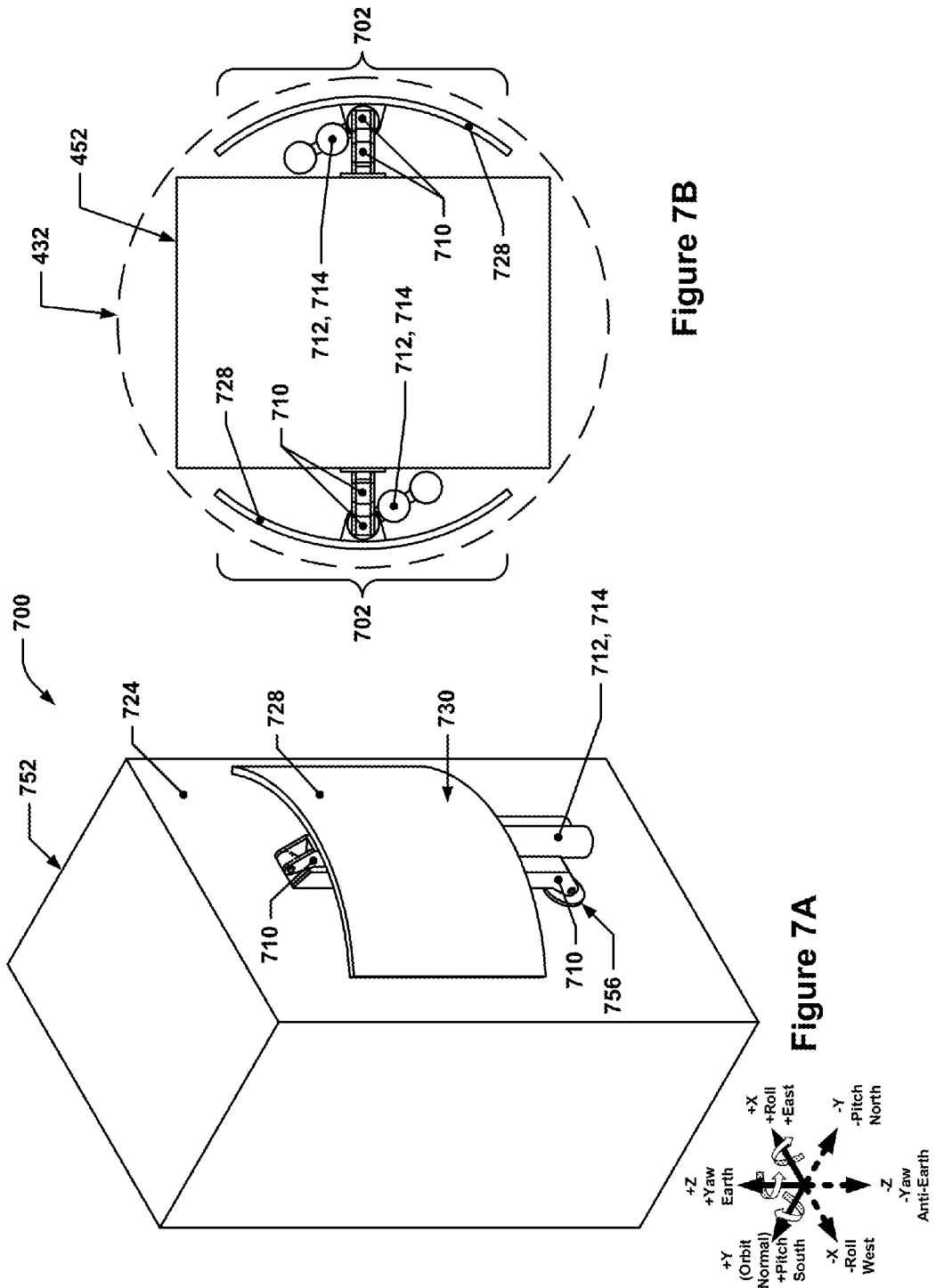

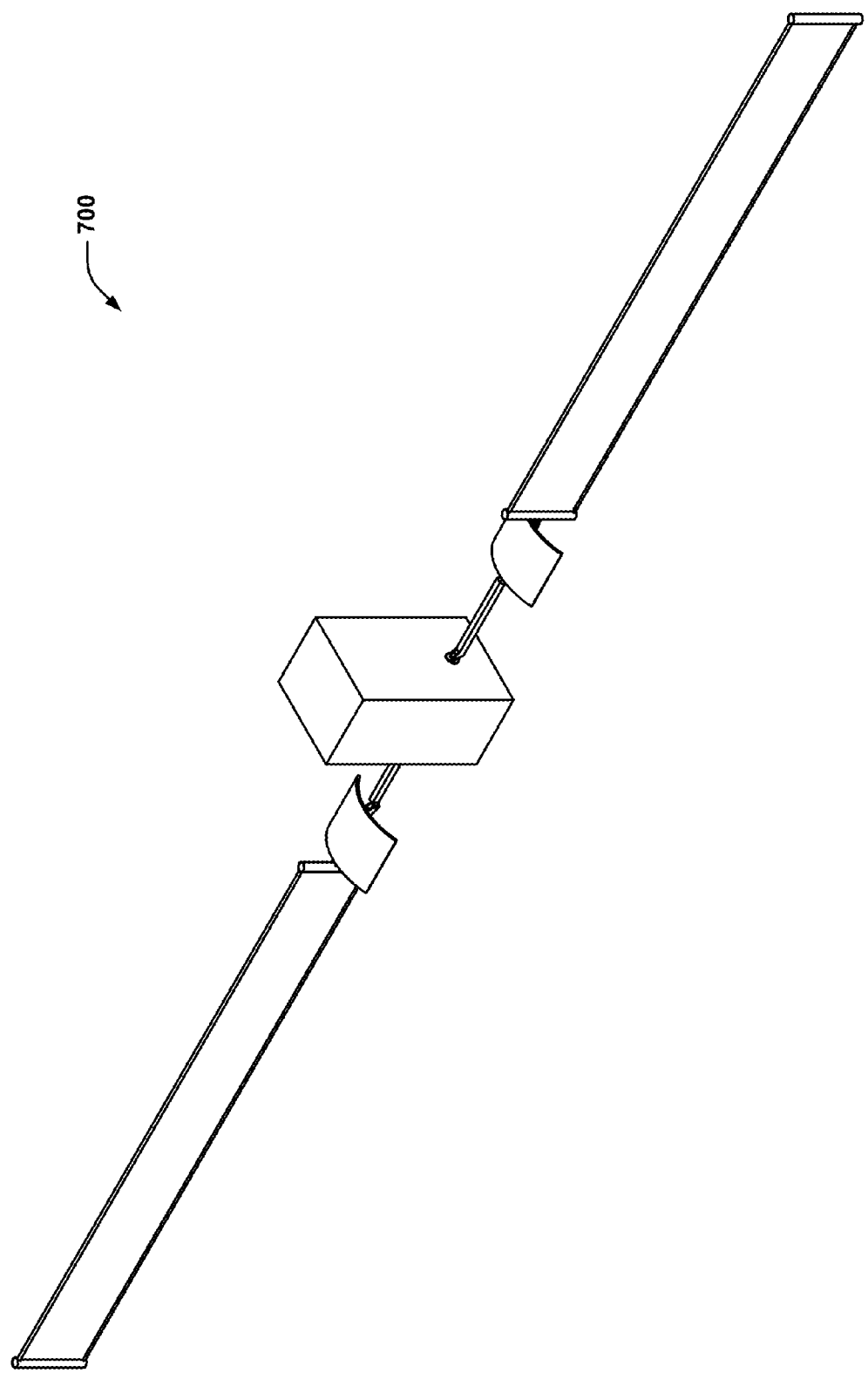

FLEXIBLE ARRAY SUPPORT STRUCTURE

TECHNICAL FIELD

This invention relates generally to a spacecraft configured to use rollable solar panels, and particularly to solar array support structure packaging and deployment techniques for such a spacecraft.

BACKGROUND OF THE INVENTION

The assignee of the present invention manufactures and deploys spacecraft for, inter alia, communications and broadcast services. Market demands for such spacecraft have imposed increasingly stringent requirements on spacecraft payload operational capacity. Consequently, such spacecraft may utilize large-area solar panel arrays.

One solar panel technology that may be used in such solar panel arrays is rollable solar panel technology. FIG. 1 depicts a simplified isometric view of a rollable solar panel unit 114. Rollable solar panel unit 114 typically includes a rollable solar panel 111 that may consist of a flexible substrate on which a number of thin film solar cells may be disposed. Rollable solar panel 111 may be wound around a deployment spool 115. Such rollable solar panels may, as illustrated, have a long, thin rectangular shape with opposing short edges and opposing long edges orthogonal to the opposing short edges. The short edges may be substantially parallel to the deployment spool 115 center axis. One short edge may be connected with the deployment spool 115, and the opposing short edge may be proximate to, or connected with, a mounting frame 107. The long edges may be connected with collapsible stiffening members 101, e.g., composite tube sections, that connect the deployment spool 115 with the mounting frame 107. The collapsible stiffening members 101 may be flattened or collapsed, such as is visible in collapsing segment 105, when wound around stiffener winding areas 113 of the deployment spool 115. Similarly, the rollable solar panel 111 may be wound around a solar cell winding area 117 of the deployment spool 115. To deploy the rollable solar panel 111, the deployment spool 115 may be rotated to unwind the rollable solar panel 111 and the collapsible stiffening members 101. The collapsible stiffening members 101, once free of the deployment spool, may revert to their un-collapsed states, such as shown in un-collapsed segment 103, and provide a stiff framework for supporting the unwound flexible solar panel. Typically, the mounting frame 107 will remain stationary and the deployment spool 115 will rotate and move away from the mounting frame 107 as the rollable solar panel 111 deploys.

Large solar panels may thus be packaged in a relatively small space. For example, a rollable solar panel with a deployed size of approximately 16 ft by 92 ft may, in a stowed state, occupy a volume substantially corresponding to a 2 ft diameter cylinder approximately 16 ft in length. Examples of such rollable solar panel technology may be found in U.S. Pat. No. 8,109,472 to Keller et al. Rollable solar panels, while providing a compact stowed configuration and potentially very large photovoltaic areas when deployed, may be generally incapable of providing solar photovoltaic power until after the rollable solar panel is actually deployed.

Rollable solar panels may require support structures that space the rollable solar panels off from the exterior surfaces of a spacecraft and that orient the rollable solar panels once deployed. Such support structures may include booms or other foldable structures. Existing boom structures, such as booms that generally unfold along a single axis away from the spacecraft, e.g., along the pitch axis of the spacecraft, may generate large moments of inertia about the spacecraft center of gravity and may exhibit undesirable amounts of bending along that axis. One such deployment structure is shown in FIG. 2, which depicts a spacecraft with uniaxial boom structures supporting rollable solar panels. The spacecraft 200 may have a main body 252 and two extensible solar arrays 202 that each include a yoke segment 210 and four array segments 212. Two rollable solar arrays 214 may be attached to each array segment 212. The yoke segment 210 and the array segments 212 may all deploy along the pitch axis of the spacecraft 200. In a stowed configuration, the rollable solar panels 214 may be rolled up, and the yoke segment 210 and the array segments 212 may be folded up against the main body 252 in a concertinaed fashion. As a result, the undeployed arrays are substantially incapable of generating solar photovoltaic power.

In view of the foregoing, the present inventor has realized that there is a need for a deployable rollable solar array support structure that provides higher inherent stiffness in a direction along, for example, the pitch axis of the spacecraft coupled with a lower moment of inertia when the rollable solar array support structure is deployed. The present inventor has also realized that there is a need, in some circumstances, for such a structure to facilitate solar power generation when in the stowed configuration.

SUMMARY OF INVENTION

The present inventor has appreciated that, as discussed with respect to various implementations described herein, an extensible solar array may be provided that includes one or more extensible yoke segments that form a first extensible assembly with a proximal end configured to be mounted to a spacecraft and a distal end connected with one or more second extensible assemblies each featuring one or more array segments. The yoke segments and the array segments may generally each be long, boom-like or truss-like structures longer in one direction than in other, orthogonal directions.

The array segments may be configured such that rollable solar panel modules or assemblies may be mounted to the array segments so that the deployment spool axis of each rollable solar panel is substantially parallel with the long axis of the corresponding array segment.

The extensible solar array may be configured to be movable from a stowed configuration to a deployed configuration. In the stowed configuration, the yoke segments and array segments may be substantially parallel to the yaw axis of the spacecraft to which the extensible solar array is mounted.

In the deployed configuration, the one or more yoke segments may be unfolded so as to be substantially perpendicular to the yaw axis, and the one or more array mounting segments may be unfolded to be substantially perpendicular to the pitch axis. The rollable solar panels may then be extended in a direction parallel to the pitch axis to place the extensible solar array into the fully deployed configuration.

In some implementations, an extensible solar array may be provided that includes at least one yoke segment and at least one array segment. Each yoke segment may have a yoke axis extending between a first end of the yoke segment and a second end of the yoke segment, and each array segment may have an array segment axis extending between a first end of the array segment and a second end of the array segment. Each array segment may be configured to support a rollable solar panel unit such that a roll-up axis of the rollable solar panel unit is substantially parallel to the array segment axis of the array segment when the rollable solar panel unit is supported by the array segment. In such implementations, the at least one yoke segment may form a first extensible assembly with a proximal end and a distal end, and the at least one array segment may form at least one second extensible assembly. The proximal end of the first extensible assembly may be configured to be rotatably connected with a side of a spacecraft, the spacecraft having a pitch axis, a roll axis, and a yaw axis that are all orthogonal to one another. The at least one second extensible assembly may be rotatably connected with the first extensible assembly at the distal end of the first extensible assembly. The at least one yoke segment and the at least one array segment may be movable from a stowed configuration to a deployed configuration and the extensible solar array may be configured such that when the proximal end of the first extensible assembly is connected with the side of the spacecraft and in the deployed configuration, the at least one yoke segment may be substantially aligned with the pitch axis and extending away from the spacecraft and each array segment axis may be substantially perpendicular to the pitch axis.

In some further implementations of the extensible solar array, the extensible solar array may also include a rigid solar panel with a solar power-generating surface. In such implementations, the rigid solar panel may be mounted to one of the at least one yoke segment and, when the extensible solar array is mounted to the side of the spacecraft and is in the stowed configuration, the solar power-generating surface may face away from the spacecraft.

In some further implementations of the extensible solar array, the extensible solar array may be further configured such that when the extensible solar array is mounted to the side of the spacecraft and is in the stowed configuration, each array segment axis is substantially parallel to the yaw axis.

In some further implementations of the extensible solar array, the extensible solar array may further include one or more rollable solar panel units, each rollable solar panel unit connected with one of the at least one array segment such that the rollable solar panel unit moves with the array segment to which the rollable solar panel unit is connected. In some such implementations, each array segment may also serve as a support frame of the rollable solar panel unit. In some other such implementations, each array segment may include mounting features configured to interface with mating mounting features on the rollable solar panel unit.

In some further implementations of the extensible solar array, at least one of the at least one second extensible assembly may include at least two array segments that are rotatably connected end-to-end, unfold in a concertinaed manner during movement from the stowed configuration to the deployed configuration, and are substantially in line with one another and arranged end-to-end in the deployed configuration.

In some such further implementations of the extensible solar array, there may be two second extensible assemblies, one of the two second extensible assemblies may be configured to unfold in a first direction substantially perpendicular to the yoke axis of the yoke segment closest to the distal end, and the other of the two second extensible assemblies may be configured to unfold in a second direction opposite the first direction.

In some further implementations of the extensible solar array, the rigid solar panel may be mounted to the yoke segment that is furthest from the side of the spacecraft when the extensible solar array is in the stowed configuration.

In some further implementations of the extensible solar array, the at least one array segment may include only one array segment and the rigid solar panel may be rotatably mounted to the yoke segment so as to be rotatable about an axis substantially parallel to the yoke axis of the yoke segment when in the deployed configuration.

In some implementations, a spacecraft may be provided. The spacecraft may include a main body, the main body having a yaw axis, a roll axis, and a pitch axis that are all mutually orthogonal to one another, and a first extensible solar array. The first extensible solar array may include at least one yoke segment, each yoke segment having a yoke axis extending between a first end of the yoke segment and a second end of the yoke segment, and at least one array segment, each array segment having an array segment axis extending between a first end of the array segment and a second end of the array segment. The at least one array segment may be configured to support a rollable solar panel unit such that a roll-up axis of the rollable solar panel unit is substantially parallel to the array segment axis of the array segment when the rollable solar panel unit is supported by the array segment. In such implementations, the at least one yoke segment may form a first extensible assembly with a proximal end and a distal end and the at least one array segment may form at least one second extensible assembly. The proximal end of the first extensible assembly may be rotatably connected with a first side of the main body, and the at least one second extensible assembly may be rotatably connected with the first extensible assembly at the distal end of the first extensible assembly. The at least one yoke segment and the at least one array segment may be movable from a stowed configuration to a deployed configuration. When the first extensible solar array is in the deployed configuration, the at least one yoke segment may be substantially aligned with the pitch axis and each array segment axis may be substantially perpendicular to the pitch axis.

In some further implementations of the spacecraft, the first extensible solar array may include a rigid solar panel with a solar power-generating surface. The rigid solar panel may be mounted to one of the at least one yoke segment, and, when the spacecraft is mounted to the first side of the spacecraft and is in the stowed configuration, the solar power-generating surface may face away from the spacecraft.

In some further implementations of the spacecraft, when the first extensible solar array is in the stowed configuration, each array segment axis of the at least one array segment may be substantially parallel to the yaw axis.

In some further implementations of the spacecraft, the spacecraft may further include a second extensible solar array substantially the same as the first extensible solar array. The proximal end of the first extensible assembly of the second extensible solar array may be rotatably connected with a second side of the spacecraft opposite the first side.

In some further implementations of the spacecraft, the spacecraft may further include at least one rollable solar panel unit. The at least one rollable solar panel unit may include a flexible solar power-generating element and a deployment spool configured to rotate about a roll-up axis of the rollable solar panel unit, may be configured to deploy the flexible solar power-generating element along an extension axis substantially perpendicular to the roll-up axis, and may be connected with one of the array segments such that the roll-up axis of the rollable solar panel unit is substantially parallel to the array segment axis of the array segment.

In some further implementations of the spacecraft, the flexible solar power-generating element may be wound around the deployment spool when the first extensible solar array is in the stowed configuration and substantially unwound from the deployment spool and extended along the extension axis in a direction substantially normal to the first side of the main body when the first extensible solar array is in the deployed configuration In some further implementations of the spacecraft, each array segment may also serve as a support frame of the rollable solar panel unit. In some other implementations of the spacecraft, each array segment may include mounting features configured to interface with corresponding mounting features on a rollable solar panel unit.

In some further implementations of the spacecraft, each second extensible assembly may include a plurality of array segments that are rotatably connected end-to-end, unfold in a concertinaed manner during movement from the stowed configuration to the deployed configuration, and are substantially in line with one another and arranged end-to-end in the deployed configuration.

In some such further implementations of the spacecraft, the first extensible solar array may include two second extensible assemblies. One of the two second extensible assemblies may be configured to unfold in a first direction substantially perpendicular to the at least one yoke segment, and the other of the two second extensible assemblies may be configured to unfold in a second direction opposite the first direction.

In some further implementations of the spacecraft, the at least one array segment may include only one array segment and the rigid solar panel may be rotatably mounted to the yoke segment so as to be rotatable about an axis substantially parallel to the yoke axis of the yoke segment when in the deployed configuration.

BRIEF DESCRIPTION OF THE DRAWINGS

FIG. 4A depicts an isometric view of an example of a spacecraft featuring extensible solar arrays with the extensible solar arrays in the stowed position.

FIG. 4B depicts a top view of the spacecraft of FIG. 4A and a circle indicating an example launch fairing envelope.

FIG. 6A depicts an isometric view of another example of a spacecraft featuring extensible solar arrays with the extensible solar arrays in the stowed position.

FIG. 6B depicts a top view of the spacecraft of FIG. 6A and a circle indicating an example launch fairing envelope.

FIG. 7A depicts an isometric view of an example of a spacecraft featuring extensible solar arrays with the extensible solar arrays in the stowed position.

FIG. 7B depicts a top view of the spacecraft of FIG. 7A and a circle indicating an example launch fairing envelope.

FIGS. 7C-7L depict isometric views of the spacecraft of FIG. 7A with the extensible solar arrays in various stages of deployment.

DETAILED DESCRIPTION

Specific exemplary implementations of the invention will now be described with reference to the accompanying drawings. This invention may, however, be embodied in many different forms, and should not be construed as limited to the implementations set forth herein. Rather, these implementations are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which one generally linear or flat part is either parallel to, or at a small acute angle to, another generally linear or flat part.

The phrase "substantially normal" as used herein, unless otherwise expressly indicated, refers to a relationship in which a plane or generally flat part or surface is either normal to, or at a minimum angle close to 90° with respect to, a reference axis. A plane which is substantially normal to an axis may be, for example, at as much as approximately a 80° minimum angle with respect to the axis and still be considered to be substantially normal. Similarly, the phrase "substantially perpendicular" may be used to refer to components of a generally linear nature (or to axes of components) that are either perpendicular to one another or that are at an angle close to 90° with respect to one another.

Figure 3:
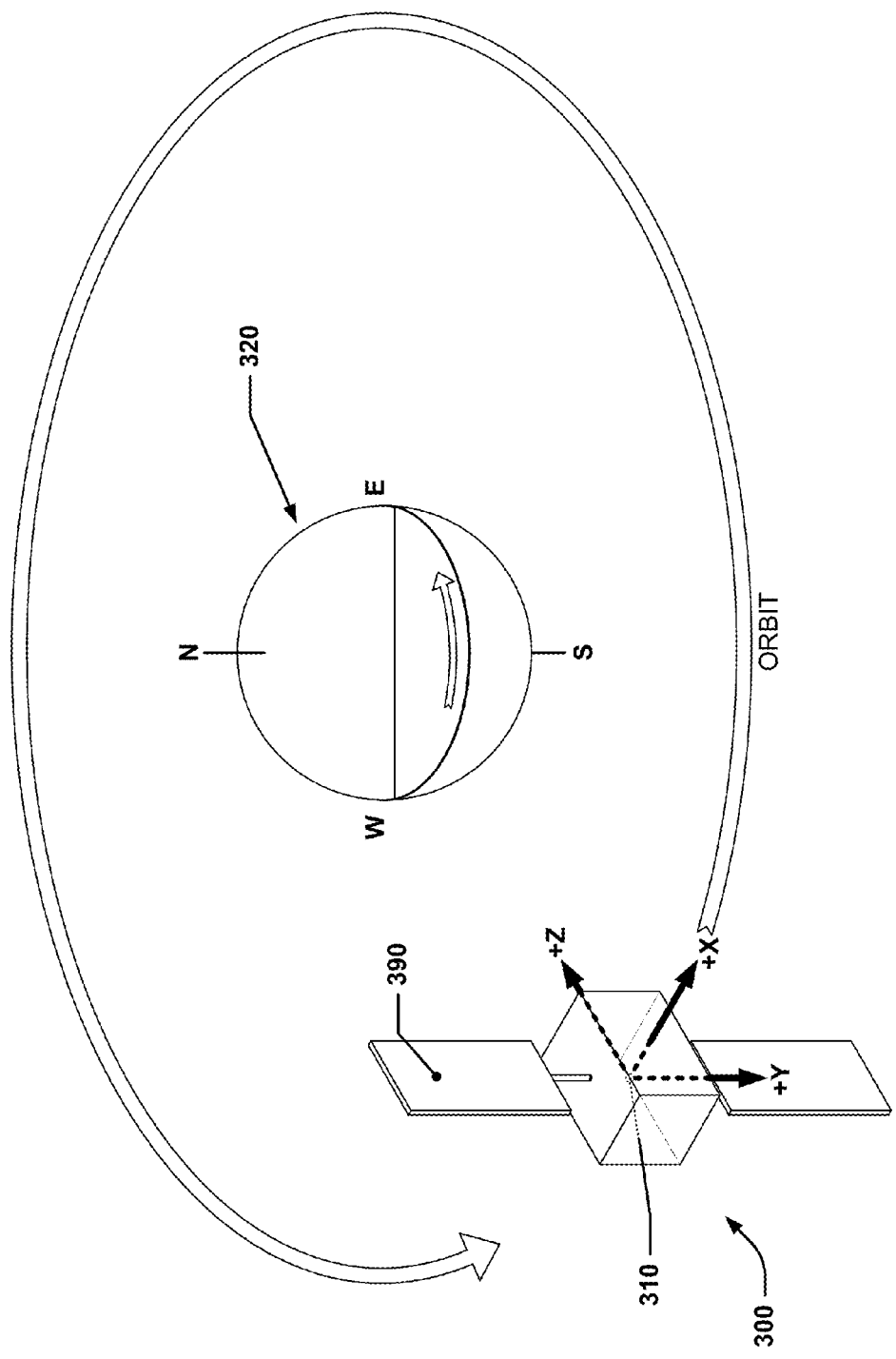
FIG. 3 depicts a simplified diagram showing a generic satellite in orbit about a planet.

FIG. 3 depicts a simplified diagram of a spacecraft in orbit around the Earth. A spacecraft 300 is shown in a nominal equatorial orbit around Earth 320. The spacecraft 300 has a spacecraft body coordinate frame 310 having roll (x), pitch (y), and yaw (z) axes. The coordinate frame for a spacecraft is typically centered, for convenience, on the spacecraft center of gravity. While some coordinate frames shown in various other Figures in this disclosure may show the coordinate frame offset from the spacecraft center of gravity to avoid obstructing depicted elements or structures of the spacecraft, it is to be understood that such coordinate frames may also be substantially centered on the spacecraft center of gravity.

With respect to the depicted orbit, the yaw axis is defined as being directed along a line intersecting the center of mass of the Earth 320 and the center of mass of the spacecraft 300; the roll axis is defined as being perpendicular to the yaw axis and lying in the plane of the orbit in the direction of the spacecraft velocity vector; and the pitch axis (y) is defined as being normal to the x and z axes. These three vectors define a three-axis, right-hand orthogonal system.

The satellite 300 may include one or more solar panel arrays 390 that are configured to deploy along the pitch axis. The solar panel arrays 390 may be rotatably connected with the spacecraft to allow the solar panel arrays 390 to be rotated about the pitch axis or an axis substantially parallel to the pitch axis. This may allow the solar panel arrays 390 to be oriented substantially sunwards while the spacecraft yaw axis remains oriented towards the Earth 320. In the example spacecraft 300 shown in FIG. 3 the solar panel arrays 390 shown may be rigid solar panel arrays or rollable solar panels.

While the spacecraft shown in FIG. 3 has been described in terms referencing, for example, the Earth, spacecraft that utilize deployment structures such as those described herein may also be interplanetary spacecraft or designed to orbit bodies other than Earth. It is to be understood that the concepts discussed herein may be applied to such spacecraft as well.

Figure 4C:
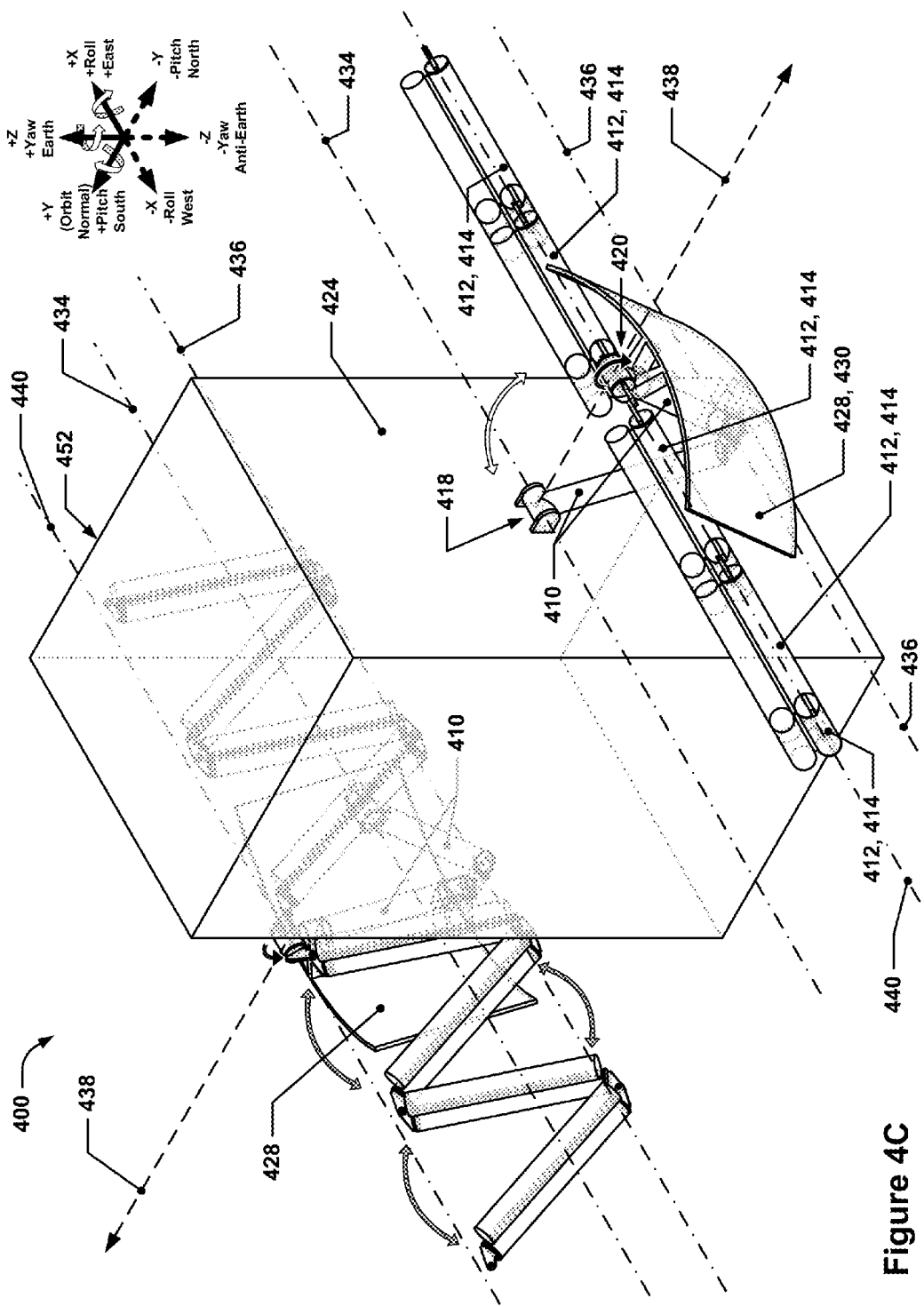
FIGS. 4C-4H depict isometric views of the spacecraft of FIG. 4A with the extensible solar arrays in various stages of deployment.

FIG. 4A depicts an isometric view of an example of a spacecraft featuring extensible solar arrays with the extensible solar arrays in the stowed position. FIG. 4B depicts a top view of the spacecraft of FIG. 4A and a circle indicating an example launch fairing envelope. FIGS. 4C-4H depict isometric views of the spacecraft of FIG. 4A with the extensible solar arrays in various stages of deployment. FIG. 4I depicts an isometric view of the spacecraft of FIG. 4A with the extensible solar arrays fully deployed. Like numbers are used in FIGS. 4A through 4I to depict similar structures. In some cases, not all components or features are indicated with callouts in all drawings, although it will be understood that any specific numbering of such components or features in other drawings is maintained in other Figures showing the same components or features without such specific callouts.

A spacecraft 400 is shown in FIGS. 4A through 4I. The spacecraft 400 may include a main body 452 and two extensible solar arrays 402 (see FIG. 4B) mounted to opposing sides 424 (only one side 424 is explicitly called out) of the main body 452. The extensible solar arrays 402 may each include one or more yoke segments 410 and one or more array segments 412. The yoke segments 410 for each of the extensible solar arrays 402 may be rotatably connected end-to-end to form a first extensible assembly 416, and two or more of the array segments 412 may be rotatably connected end-to-end to form one or more second extensible assemblies 422 (see FIG. 4F). In some implementations, only one yoke segment 410 may be used and the first extensible assembly 416 may simply feature that single yoke segment 410. Similarly, in some implementations, only one array segment 412 may be used in each second extensible assembly 422. Each extensible solar array 402 may include one or two second extensible assemblies 422, although the depicted solar arrays 402 in FIGS. 4A through 4I each feature two second extensible assemblies 422.

Figure 1:
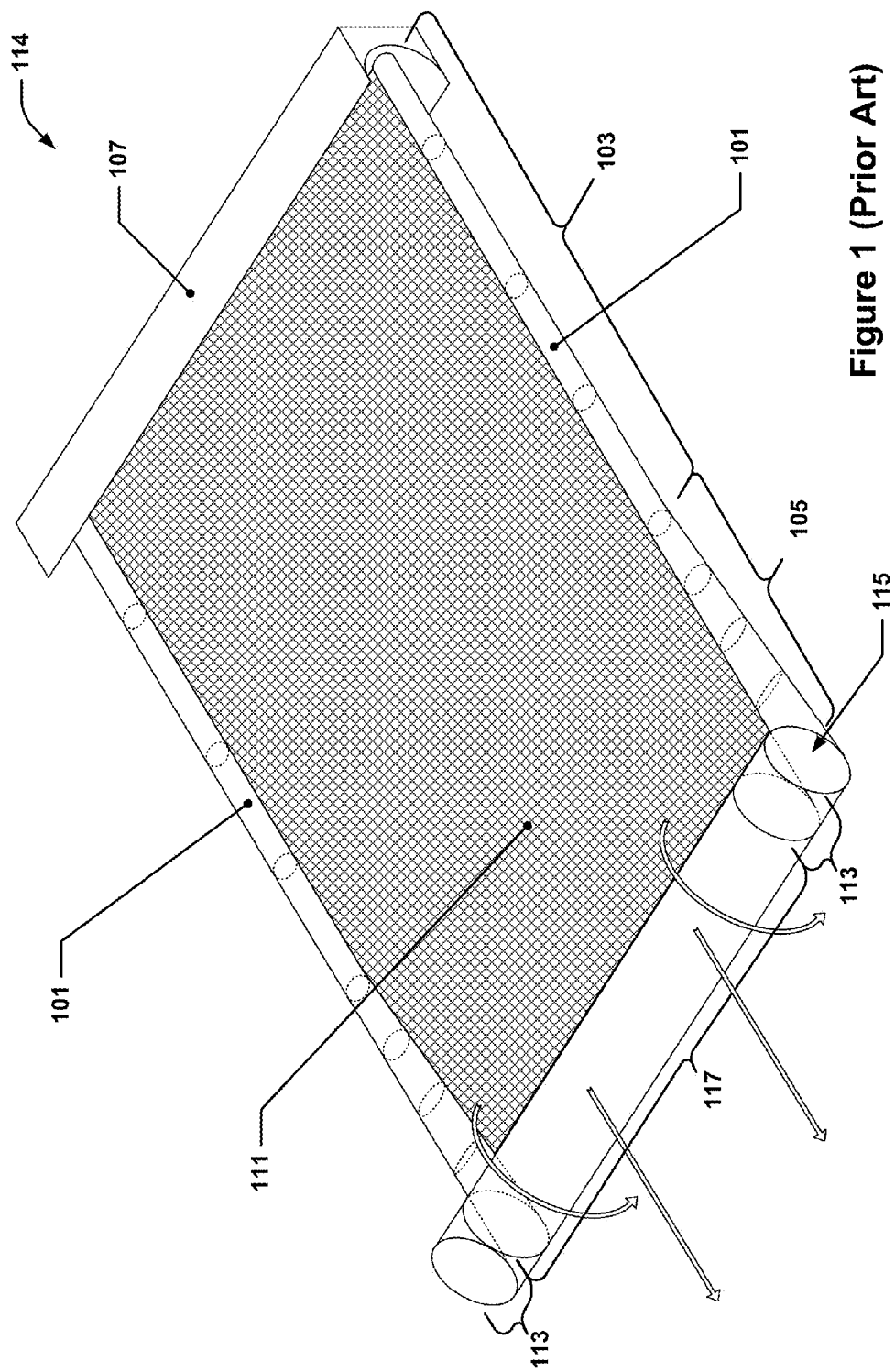
FIG. 1 depicts a simplified isometric view of a rollable solar panel unit.

Each array segment 412 may support a rollable solar panel unit 414. In some implementations, the array segments may be trusses or booms that include mounting features, e.g., brackets, for attaching rollable solar panel units. In other implementations, such as the implementations shown in FIGS. 4A through 4I, the array segments 412 may also serve as housings for the rollable solar panel units 414. For example, with reference to FIG. 1, the mounting frame 107 may form part of an array segment 412. Such implementations may be more compact when stowed than implementations with separate array segments and rollable solar panel units since the array segments and mounting frames may be integrated into a single component.

In addition to the rollable solar panel units, the extensible solar arrays 402 may also each include one or more rigid solar panels 428 that may be mounted to one of the yoke segments 410. Such rigid solar panels 402 are optional, but their inclusion may provide certain advantages. Rollable solar panel units 414, when retracted, may be incapable of providing any operationally significant amount of power. The rigid solar panels 428 may provide a means for generating solar power even when the rollable solar panel units 414 are in the retracted state.

The first extensible assembly 416 and second extensible assemblies 422 may be connected together directly or via an intermediate part or parts and may fold up into a stowed configuration when the rollable solar panel units are in a retracted state. The stowed configuration is shown in FIGS. 4A and 4B. As can be seen, in the stowed configuration, the yoke segments 410 and the array segments 412 are all positioned with their long axes substantially parallel with the yaw axis of the spacecraft 400. In the depicted implementation, the yoke segments 410, the array segments 412, and the rollable solar panel units 414 are all interposed between the sides 424 of the main body 452 and the rigid solar panels 428 in the stowed configuration. The rigid solar panels 428 may have solar power-generating surfaces 430 that face away from the main body 452 in the stowed configuration. The solar power-generating surfaces 430 may thus be largely unobstructed by other components of the spacecraft 400 and may be capable of providing photovoltaic power to the spacecraft 400 when the extensible solar arrays are in the stowed configuration. The rigid solar panels 428 may also be curved so as to fit within a launch fairing envelope 432.

Planar rigid solar panels 428 may be used as well, but may need to be smaller to avoid violating the launch fairing envelope 432. In some implementations, the rigid solar panels 428 may be formed from multiple planar panels or cells arranged in a curved or arcuate configuration so as to fit within the launch fairing envelope 432. In some other implementations, the rigid solar panels 428 may be semi-rigid or semi-flexible that allows the rigid panel 428 to be flexed into a curved shape compatible with the launch fairing envelope 432 when stowed, and that can then be allowed to spring into an unflexed, substantially planar shape after the launch fairing is removed.

In FIG. 4C, the extensible solar arrays 402 have begun deploying. As can be seen, the yoke segments 410 closest to the main body 452 have started to rotate about first yoke pivot axes 434 and the remaining yoke segments 410 have started to rotate with respect to second yoke pivot axes 436. As a result of these rotations, each of the first extensible assemblies 416 have started to extend along yoke extension axes 438. This causes distal ends 420 of the first extensible assemblies 416 to move away from proximal ends 418 of the first extensible assemblies 416. These rotational motions (partially indicated by the white arrow in FIG. 4C) may be driven by motors, sprung hinge mechanisms, pulleys, or other actuation systems.

At the same time, the second extensible assemblies 422 may begin unfolding as well. For example, the array segments 412 closest to the distal ends 420 may rotate about first array segment pivot axes 442, the array segments 412 next closest to the distal ends 420 may rotate about second array segment pivot axes 444, the array segments 412 third closest to the distal ends 420 may rotate about third array segment pivot axes 446, and the array segments 412 furthest from the distal ends 420 may rotate about fourth array segment pivot axes 448 (the various array segment pivot axes are called out in FIG. 4E). Thus, the array segments 412 forming each of the second extensible assemblies 422 may be unfolded in a concertinaed fashion and the second extensible assemblies 422 may thereby be extended in a direction generally perpendicular to the long axes of the yoke segments, e.g., parallel to the roll axis of the spacecraft 400. These unfolding rotations of the array segments 412 are indicated, at least in part, by grey arrows in FIG. 4C. The unfolding of the second extensible assemblies 422 may occur simultaneously with the unfolding of the first extensible assemblies 416 or after such unfolding.

The second extensible assemblies 422 may also rotate about second extensible assembly pivot axes 440, as is shown by the black arrows in FIG. 4C. Such rotation may occur while the second extensible assemblies 422 are unfolding, prior to such unfolding, or after such unfolding is completed. In the implementation shown, for example, the second extensible assemblies 422 may be at least partially rotated about the second extensible assembly pivot axes 440 prior to rotating the array segments 412 about the first, second, third, and fourth array segment pivot axes to avoid interference between the array segments 412 and the rigid solar panel 428.

Figure 4D:
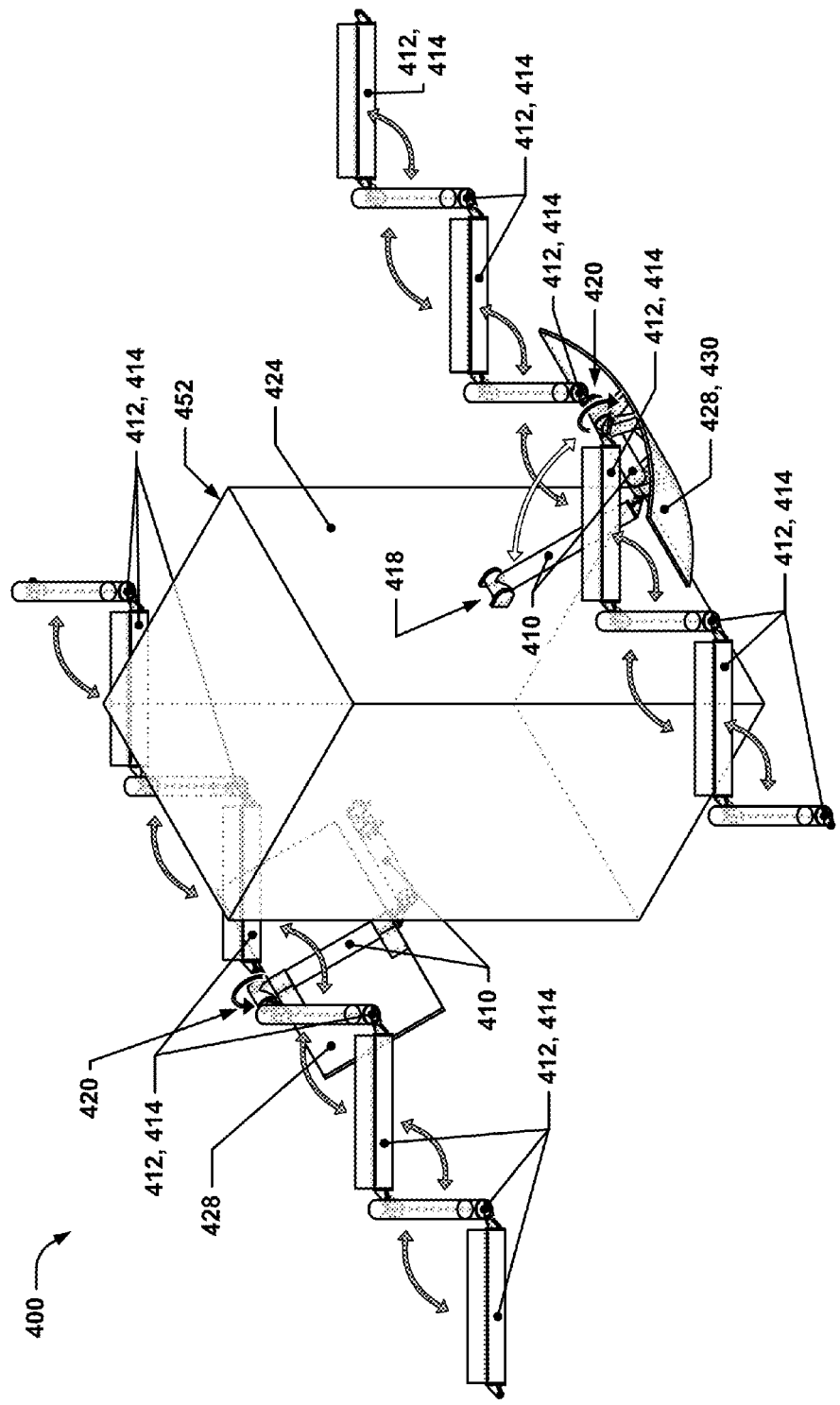
Figure 4E:
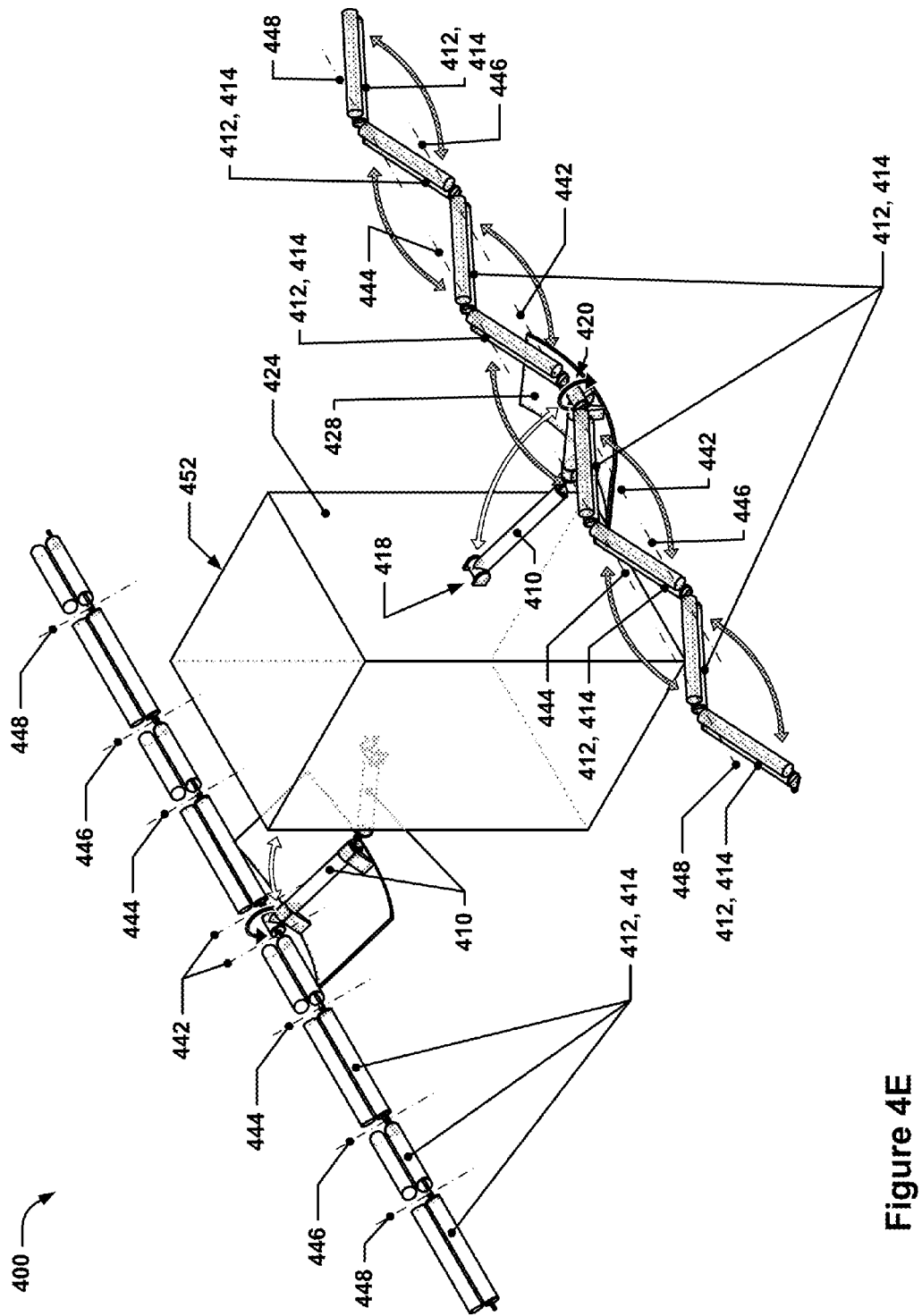

In FIG. 4D, the extensible solar arrays 402 are depicted in a further state of deployment. The yoke segments 410 have rotated sufficiently far enough (partially shown by a white arrow) that they are at right angles to one another, and the array segments 412 have rotated a similar amount (partially shown by grey arrows). The second extensible assemblies 422 may continue to be rotated about the second extensible assembly pivot axes (such rotation is shown by black arrows). FIG. 4E depicts the spacecraft 400 with the first extensible assemblies 416 and the second extensible assemblies 422 nearly completely extended.

Figure 4F:
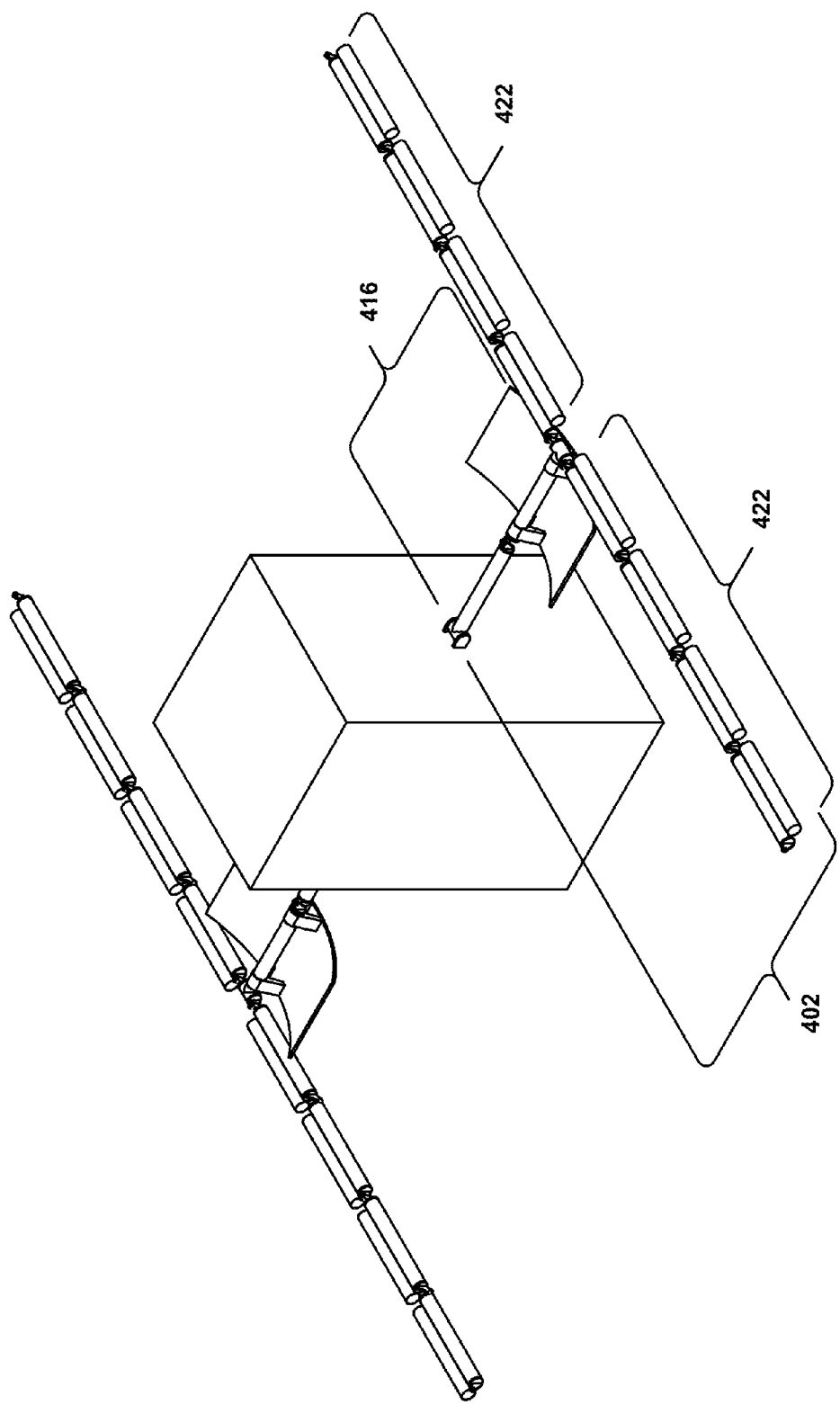

In FIG. 4F, the first extensible assemblies 416 have been completely extended and are substantially parallel to the pitch axis. In this particular implementation, this results in the first extensible assemblies 416 being substantially perpendicular to the sides 424 of the spacecraft 400. Additionally, the second extensible assemblies 422 are also completely extended in a direction substantially perpendicular to the pitch axis of the spacecraft 400. As can be seen, the second extensible assemblies 422 have been rotated about the second extensible assembly axes 440 such that the rollable solar panel units 414 are oriented facing away from the main body 452. It is to be understood that while the second extensible assemblies 422 are shown in a fully extended position that is substantially parallel to the roll axis, the first extensible assemblies 416 may be connected with the main body 452 via a rotatable mount that permits rotation of the first extensible assemblies 416, and thus the attached second extensible assemblies 422, about axes parallel to the pitch axis. Accordingly, the second extensible assemblies 422 may be rotated to be parallel to the yaw axis as well, or to any other position that is substantially perpendicular to the pitch axis. Such a rotatable mount may, alternatively, be incorporated into the first extensible assemblies 416 or the interfaces between the first extensible assemblies 416 and the second extensible assemblies 422.

Figure 4G:
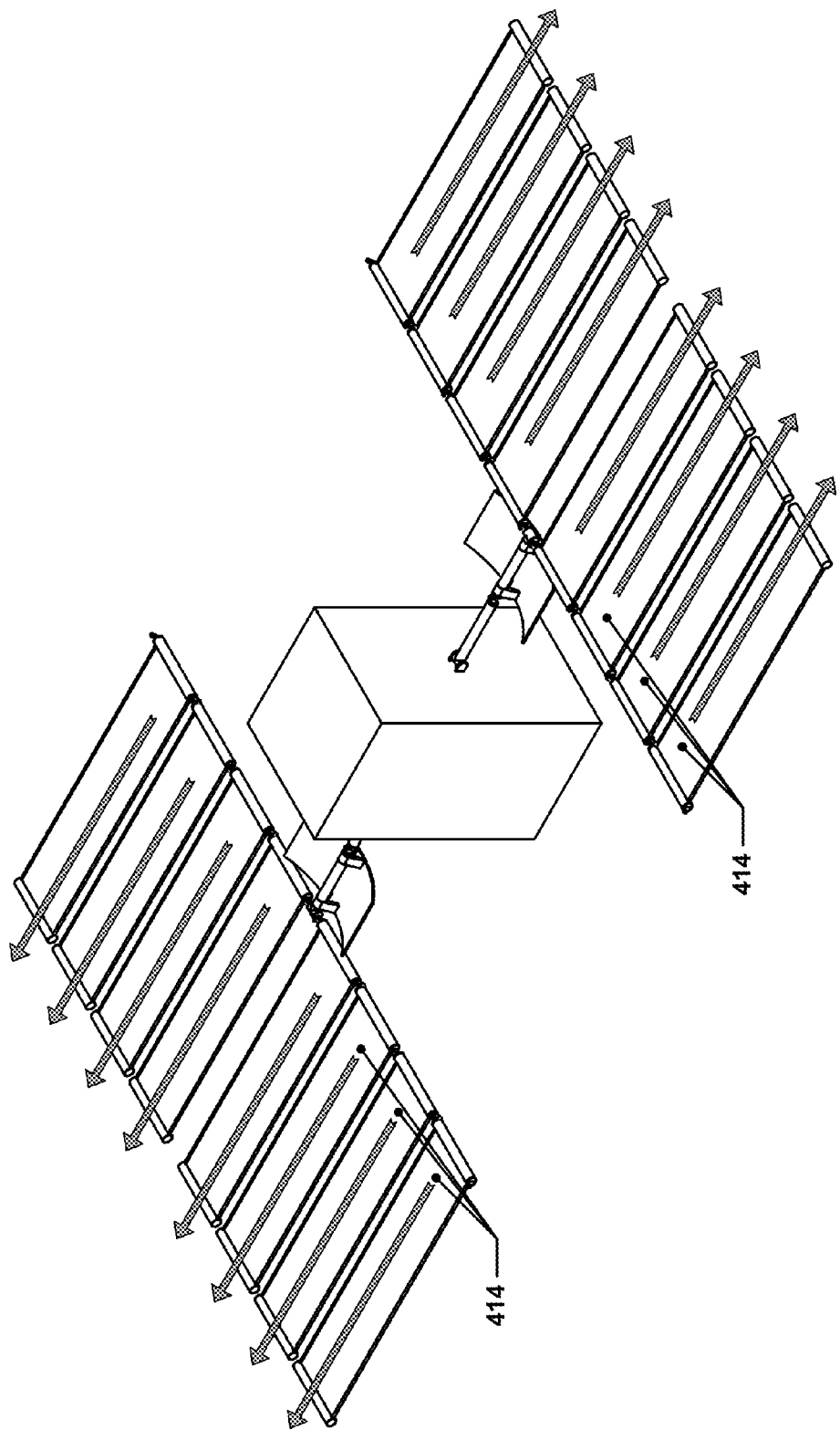
Figure 4H:
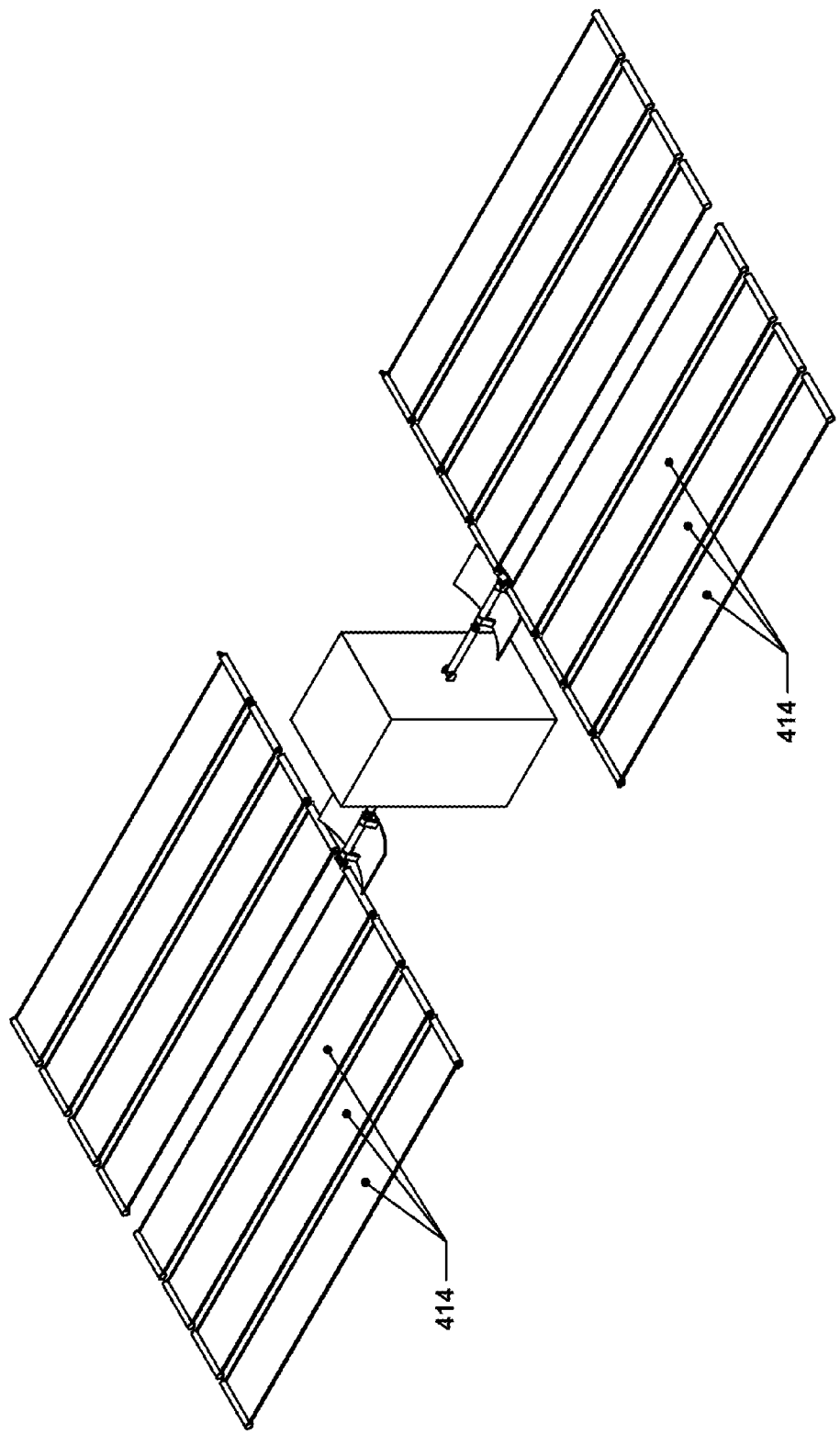
Figure 4I:
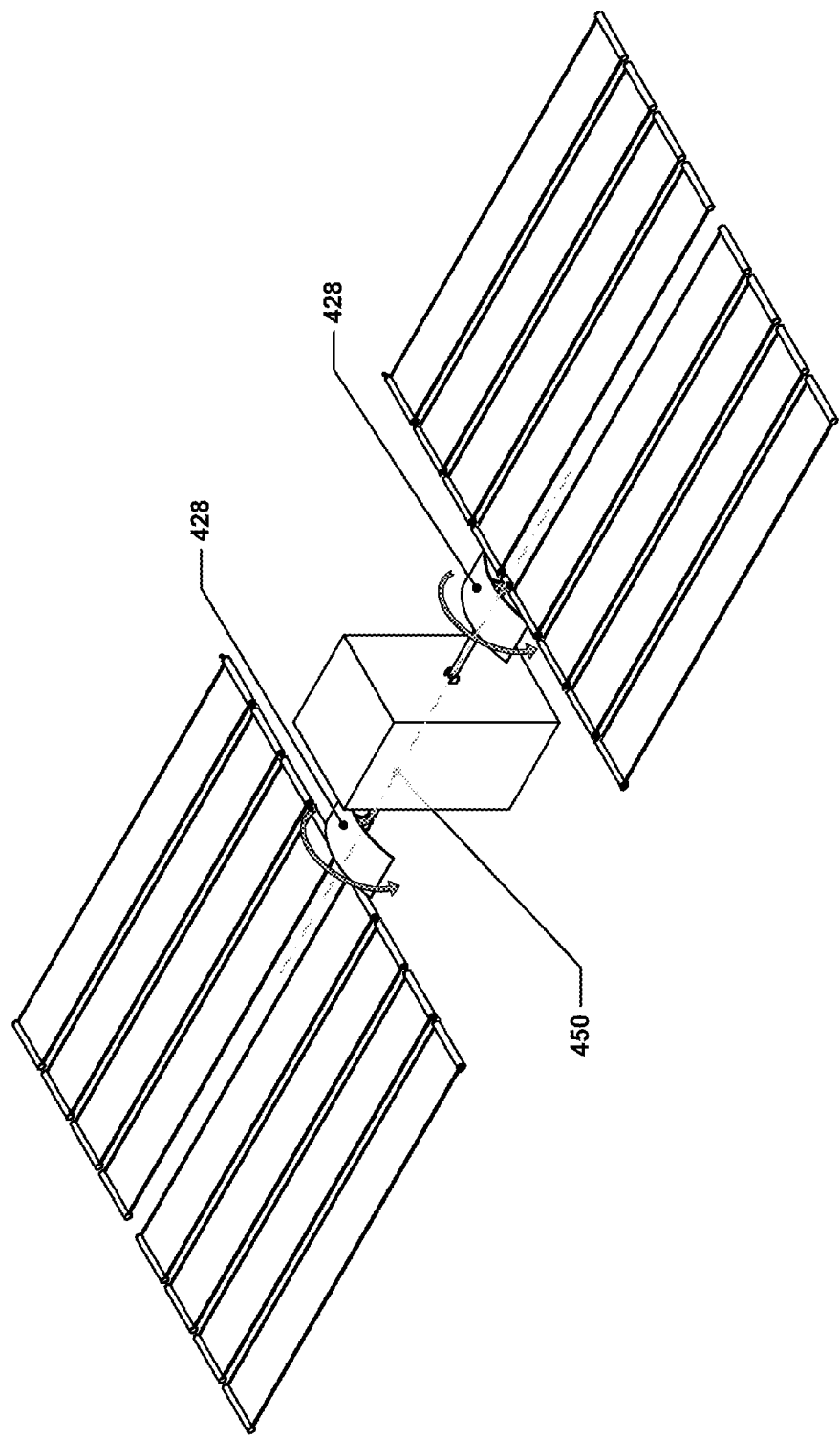
FIG. 4I depicts an isometric view of the spacecraft of FIG. 4A with the extensible solar arrays fully deployed.

In FIG. 4G, the rollable solar panel units 414 have been partially deployed. Such deployment, as discussed previously, generally involves unwinding the flexible solar panels of the rollable solar panel units 414 from the deployment spool and extending the flexible solar panels in the directions shown by the grey arrows. In FIG. 4H, the rollable solar panel units 414 are shown fully deployed.

In FIG. 4I, the rigid solar panels 428 may be rotated about rigid panel pivot axes 450, if needed. This may allow the rigid solar panels 428 to be oriented in substantially the same direction as the rollable solar panel units 414, resulting in a larger effective photovoltaic area. Of course, such rotation may only be necessary if the solar power-generating surfaces of the rollable solar panel units 414 and the rigid solar panels 428 are facing in substantially different directions and need to be brought into alignment with one another.

In some implementations, the second extensible assemblies may not require any rotation about the second extensible assembly axes relative to the distal end of the first extensible assembly at all. Such implementations may, for example, feature rollable solar panel units that are mounted to or housed by the array segments such that the rollable solar panels unroll in a direction substantially in-plane with the plane swept by the array segments when the second extensible assemblies unfold.

Implementations of extensible solar arrays using yoke segments and array segments arranged as discussed above with respect to FIGS. 4A through 4I and discussed below with respect to later Figures may provide improved support structure stiffness along the pitch axis and lower mass moments of inertia about the yaw and roll axes of the spacecraft as compared with, for example, solar array designs such as the unidirectional truss shown in FIG. 2.

The above-described implementation results in an extensible solar array configuration that may have significantly reduced mass moments of inertia about the roll and yaw axes, compared to the prior art, while providing substantially the same overall photovoltaic area and occupying substantially the same space when fully deployed. The above-mentioned benefit of the presently disclosed techniques may be better appreciated by referring to FIGS. 5A and 5B.

Figure 2:
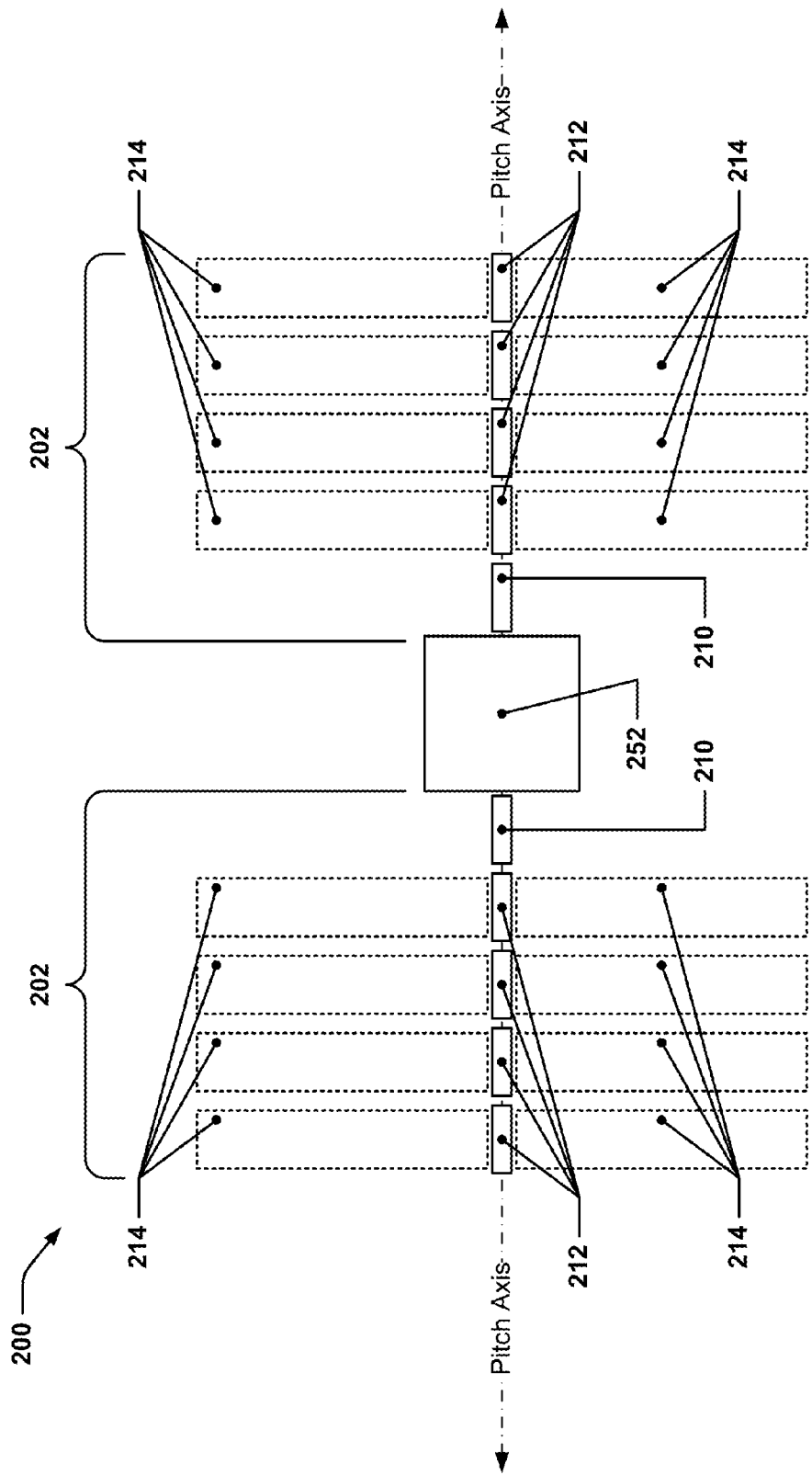
FIG. 2 depicts a simplified diagram of a spacecraft with uniaxial support structures for rollable solar panels.
Figure 5A:
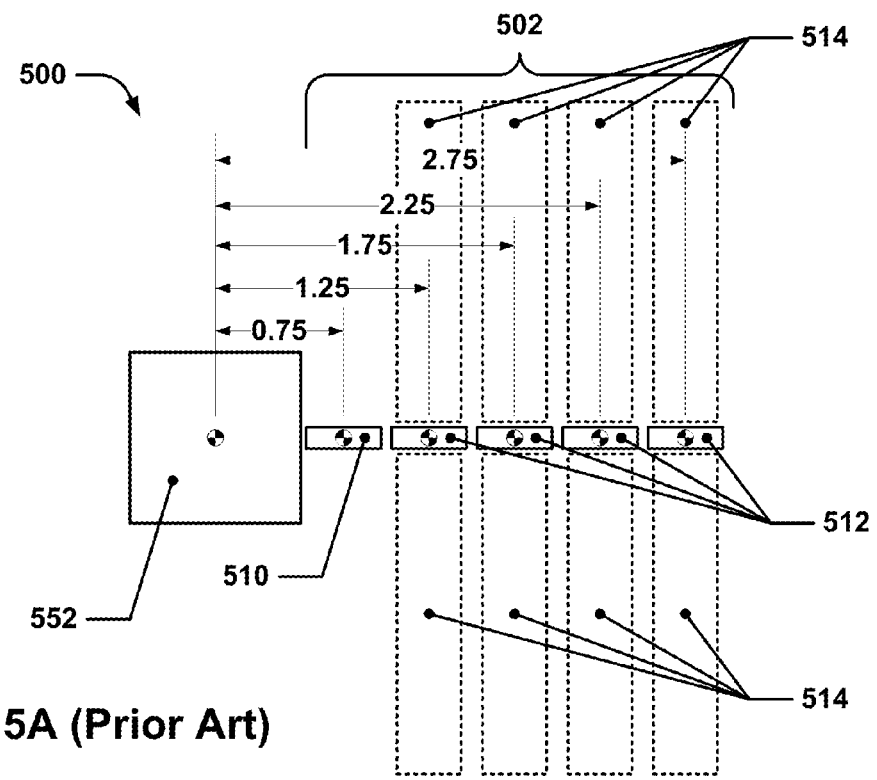
FIG. 5A depicts a simplified representation of part of a spacecraft with a deployed unidirectional truss rollable solar panel array.

FIG. 5A depicts a simplified representation of part of the prior art spacecraft shown in FIG. 2. As can be seen, a spacecraft 500 with a main body 552 has an extensible solar array 502 with four array segments 512 connected end-to-end and connected with the main body 552 by a yoke segment 510. Each array segment has two rollable solar panel units 514 attached and extending in opposite directions. If each of the yoke and array segments are treated as identical point masses spaced at the distances shown from the center of gravity of the main body 552, the segments shown would produce a yaw or roll moment of inertia equal, per the parallel axis theorem, to $m(0.75^2+1.25^2+1.75^2+2.25^2+2.75^2)=17.8$ mass-area units (where m is the mass of each segment; the distances shown are somewhat arbitrary and do not correspond to any particular implementation).

Figure 5B:
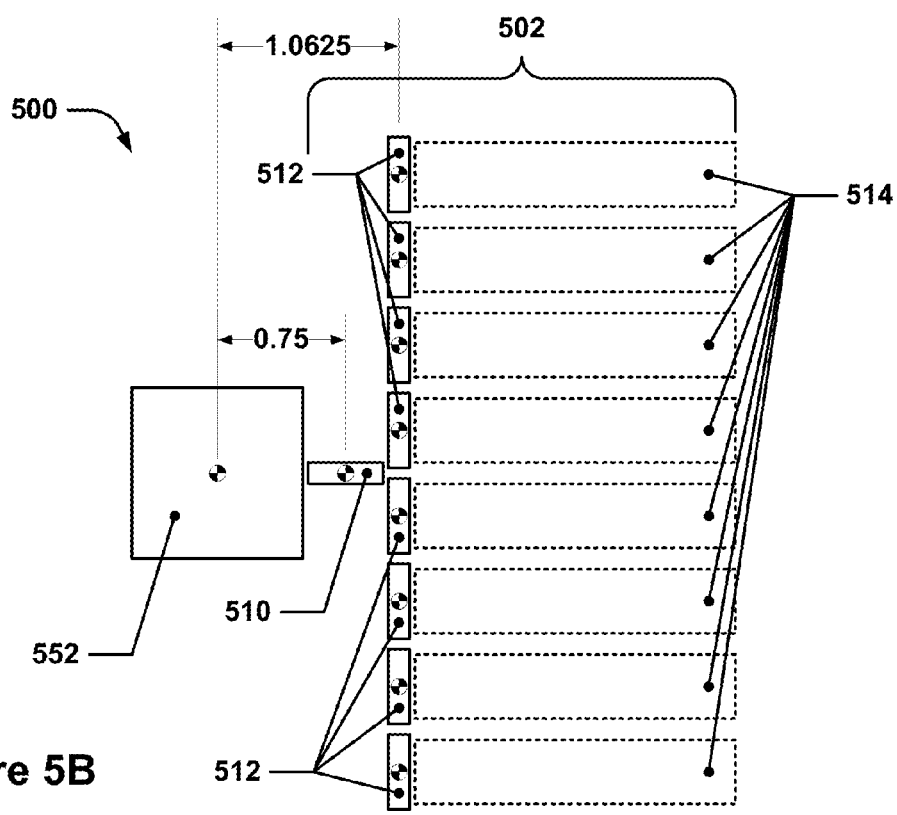
FIG. 5B depicts a simplified representation of part of a spacecraft with a deployed extensible solar array with array segments deployed perpendicular to the yoke segment.

In contrast, FIG. 5B depicts a simplified representation of part of a spacecraft with a deployed extensible solar array with array segments deployed perpendicular to the yoke segment. Unlike the unidirectional truss structure of FIG. 5A, the extensible solar array 502 of FIG. 5B features array segments 512 extending in a direction perpendicular to the pitch axis (although spaced off from the main body 552 by a yoke segment 510)—an arrangement similar to that shown in FIGS. 4A through 4I, although without a rigid solar panel and with only one yoke segment instead of two. Each array segment has a rollable solar panel unit 514 attached and extending away from the spacecraft main body. If each of the yoke and array segments are treated as identical point masses spaced at the distances shown from the center of gravity of the main body 552, the segments shown would produce a yaw or roll mass moment of inertia equal, per the parallel axis theorem, to $m(0.75^2+8·1.0625^2)=9.6$ mass-area units (where m is the mass of each segment; the distances shown are somewhat arbitrary and do not correspond to any particular implementation).

Thus, as can be seen, while the two different extensible solar arrays 502 shown in FIGS. 5A and 5B both provide substantially the same overall photovoltaic area and occupy substantially the same space when fully deployed, the mass moments of inertia about the roll and yaw axes associated with the extensible solar array 502 of FIG. 5B may be considerably, e.g., nearly 50%, lower than the mass moments of inertia about such axes with respect to the extensible solar array 502 of FIG. 5A. This may reduce the amount of impulse required to effect an attitude change for the spacecraft.

As can be seen, the array segments 512 in FIG. 5A form a cantilevered beam that extends along the pitch axis to the same extent as the rollable solar panel units 514. By contrast, the structure shown in FIG. 5B only has a yoke segment lying on the pitch axis; the array segments are not cantilevered along the pitch axis in this configuration, allowing the support structure formed by the yoke segment 510 and the array segments 512 to have a much higher inherent stiffness along the pitch axis than the cantilevered beam support structure of FIG. 5A. As a result, pointing performance of the spacecraft may be improved.

Another benefit to the implementation shown in FIG. 5B over the design of FIG. 5A is that the array segments of FIG. 5B may be considerably lighter than the array segments of FIG. 5A. This is because the array segments 512 of FIG. 5A must be engineered to each support two rollable solar panel units 514, whereas the array segments 512 of FIG. 5B may be engineered so as to each support only one rollable solar panel unit 514. This results in further reductions of the yaw or roll mass moments of inertia for the implementation shown in FIG. 5B.

Figure 6C:
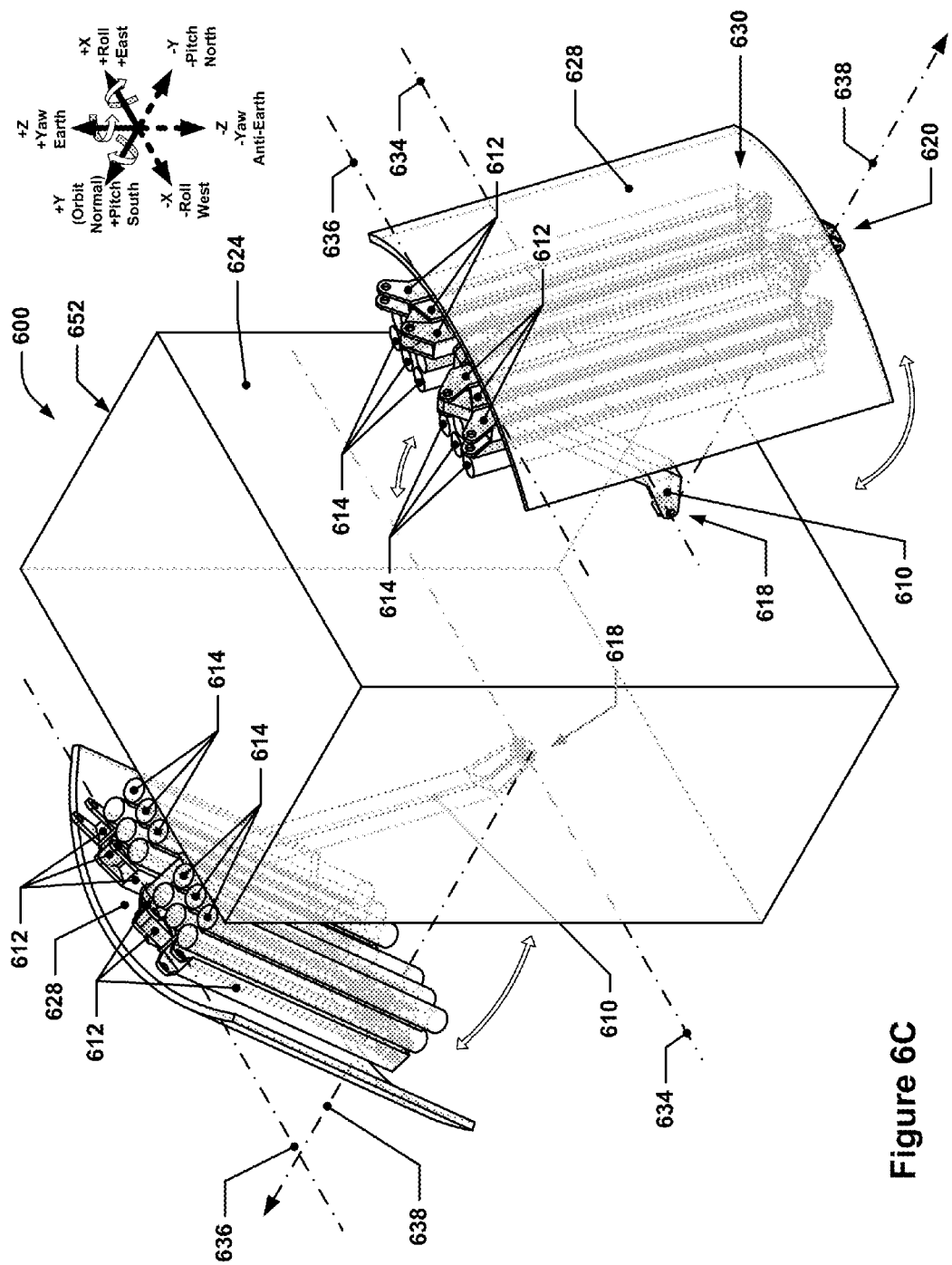
FIGS. 6C-6K depict isometric views of the spacecraft of FIG. 6A with the extensible solar arrays in various stages of deployment.
Figure 6D:
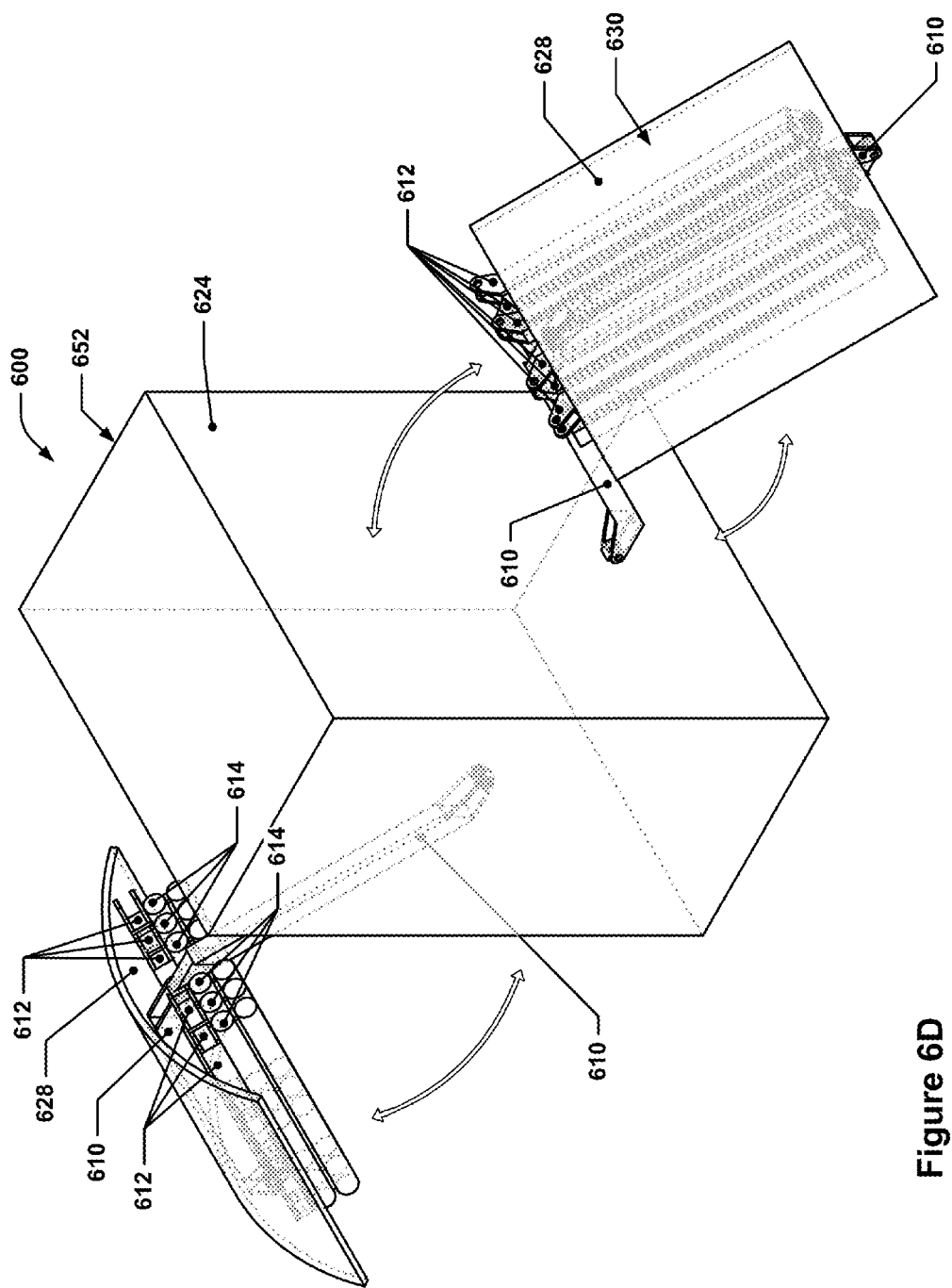

FIG. 6A depicts an isometric view of another example of a spacecraft featuring extensible solar arrays with the extensible solar arrays in the stowed position. FIG. 6B depicts a top view of the spacecraft of FIG. 6A and a circle indicating an example launch fairing envelope. FIGS. 6C-6K depict isometric views of the spacecraft of FIG. 6A with the extensible solar arrays in various stages of deployment. FIG. 6L depicts an isometric view of the spacecraft of FIG. 6A with the extensible solar arrays fully deployed. Like numbers are used in FIGS. 6A through 6L to depict similar structures. In some cases, not all components or features are indicated with callouts in all drawings, although it will be understood that any specific numbering of such components or features in other drawings is maintained in other Figures showing the same components or features without such specific callouts.

A spacecraft 600 is shown in FIGS. 6A through 6L. The spacecraft 600 may include a main body 652 and two extensible solar arrays 602 (see FIG. 6B) mounted to opposing sides 624 (only one side 624 is explicitly called out) of the main body 652. The extensible solar arrays 602 may each include one or more yoke segments 610 and one or more array segments 612 (see FIGS. 6G through 6I for clearer views of the yoke segments 610 and the array segments 612). The yoke segments 610 for each of the extensible solar arrays 602 may be rotatably connected end-to-end to form a first extensible assembly 616, and two or more of the array segments 612 may be rotatably connected end-to-end to form one or more second extensible assemblies 622 (see FIG. 6J). In some implementations, only one yoke segment 610 may be used and the first extensible assembly 616 may simply feature that single yoke segment 610. Similarly, in some implementations, only one array segment 612 may be used in each second extensible assembly 622. Each extensible solar array 602 may include one or two second extensible assemblies 622, although the depicted solar arrays 602 in FIGS. 6A through 6I each feature two second extensible assemblies 622.

Each array segment 612 may support a rollable solar panel unit 614. In the depicted implementation, the array segments 612 are trusses or booms that include mounting features, e.g., brackets, for attaching the rollable solar panel units 614.

In addition to the rollable solar panel units, the extensible solar arrays 602 may also each include one or more rigid solar panels 628 that are mounted to one of the yoke segments 610 (the details of the hardware for connecting the rigid solar panels 628 to the respective yoke segments 610 are not shown in FIGS. 6A through 6L). As discussed with respect to FIGS. 4A through 4I, such rigid solar panels 602 are optional, but their inclusion may provide certain advantages. The rigid solar panels 628 may provide a means for generating solar power even when the rollable solar panel units 614 are in the retracted state.

The first extensible assembly 616 and second extensible assemblies 622 may be connected together and may fold up into a stowed configuration when the rollable solar panel units are in a retracted state. The stowed configuration is shown in FIGS. 6A and 6B. As can be seen, in the stowed configuration, the yoke segments 610 and the array segments 612 are all positioned with their long axes substantially parallel with the yaw axis of the spacecraft 600. In the depicted implementation, the yoke segments 610, the array segments 612, and the rollable solar panel units 614 are all interposed between the sides 624 of the main body 652 and the rigid solar panels 628 in the stowed configuration. The rigid solar panels 628 may have solar power-generating surfaces 630 that face away from the main body 652 in the stowed configuration. The solar power-generating surfaces 630 may thus be largely unobstructed by other components of the spacecraft 600 and may be capable of providing photovoltaic power to the spacecraft 600 when the extensible solar arrays are in the stowed configuration. The rigid solar panels 628 may also be curved so as to fit within a launch fairing envelope 632. Planar rigid solar panels 628 may be used as well, but may need to be smaller to avoid violating the launch fairing envelope 632.

In FIG. 6C, the extensible solar arrays 602 have begun deploying. As can be seen, the yoke segments 610 closest to the main body 652 have started to rotate about first yoke pivot axes 634 and the remaining yoke segments 610 have started to rotate with respect to second yoke pivot axes 636. As a result of these rotations, each of the first extensible assemblies 616 have started to extend along yoke extension axes 638. This causes distal ends 620 of the first extensible assemblies 616 to move away from proximal ends 618 of the first extensible assemblies 616. These motions (partially indicated by the white arrows in FIG. 6C) may be driven by motors, sprung hinge mechanisms, pulleys, or other actuation systems. Such deployment motion is continued in FIG. 6D.

Figure 6E:
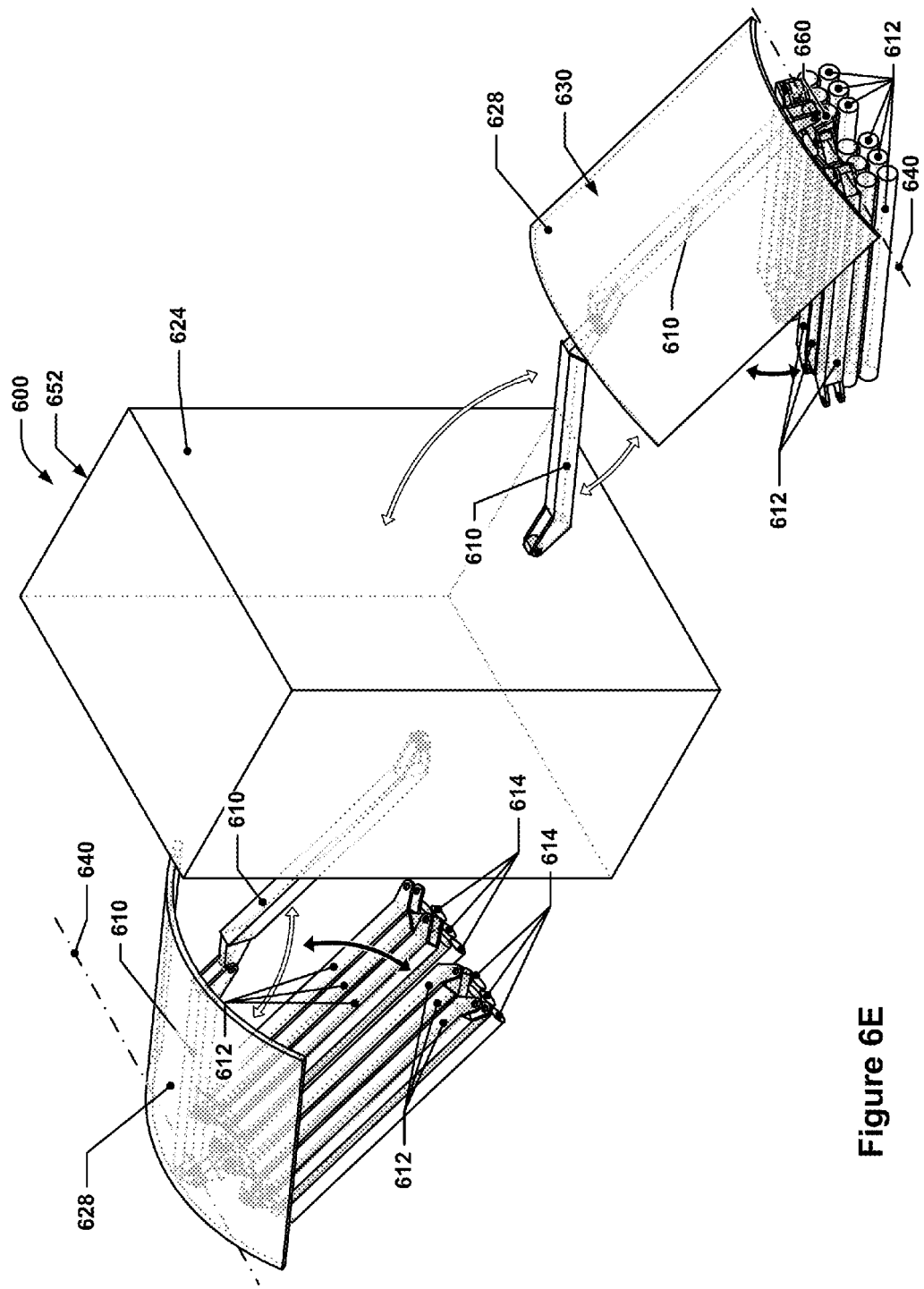

In FIG. 6E, the second extensible assemblies 622 have begun rotating about second extensible assembly axes 640. This rotational motion is indicated by the black arrows in FIG. 6E. The first extensible assemblies 616 continue to unfold while this occurs. In some implementations, such rotational motion of the second extensible assemblies 622 may not occur until after the first extensible assemblies 616 are fully extended. In some implementations, such as that shown in FIGS. 6A through 6L, the first extensible assemblies 616 may include a smaller linkage segment 660 that may rotate about a rotation axis parallel to the first or second yoke pivot axes and that may be rotationally coupled with the second extensible assemblies 622 about rotational axes perpendicular to that rotation axis.

Figure 6F:
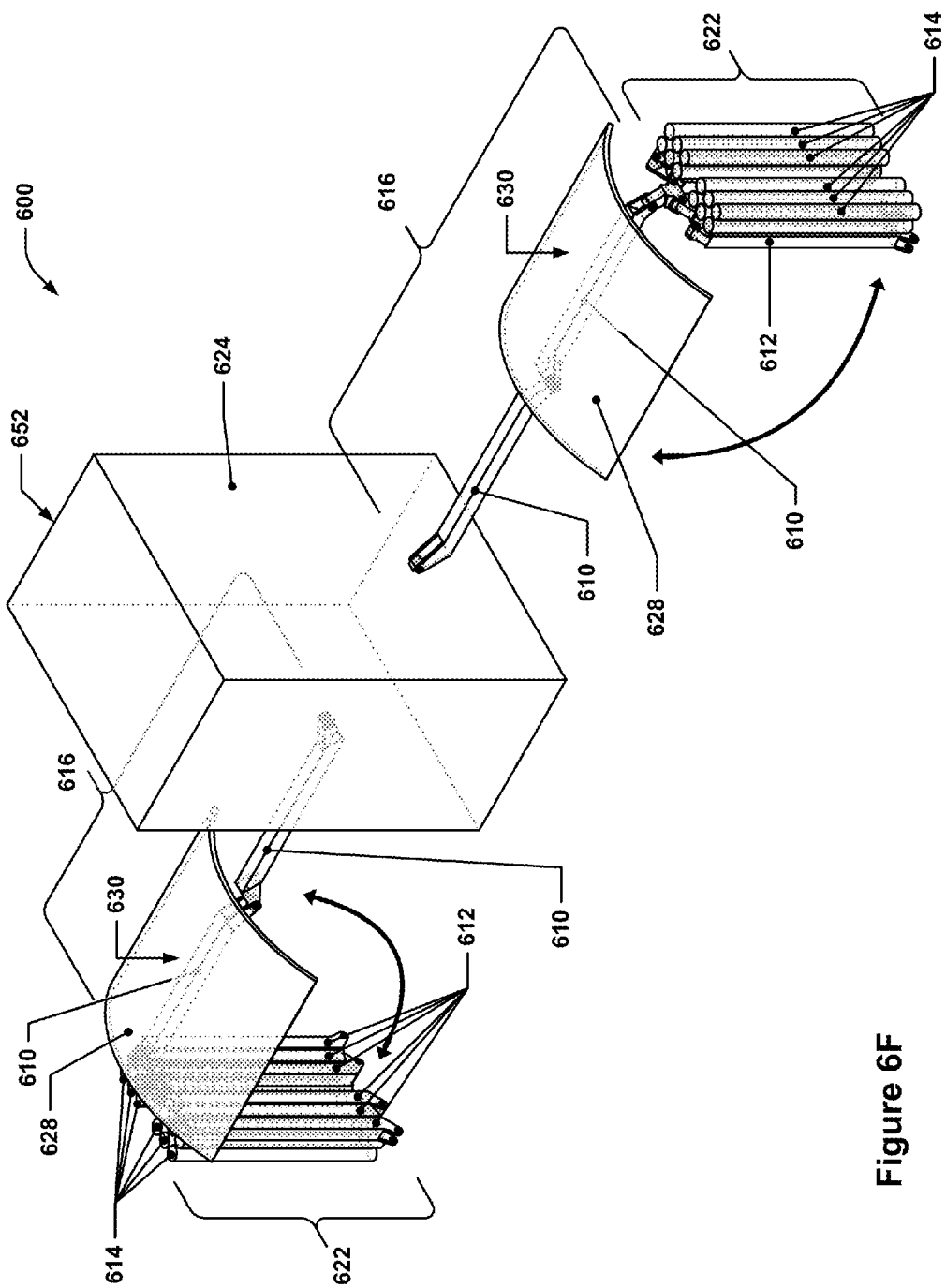

In FIG. 6F, the first extensible assemblies 616 have completely unfolded and are substantially parallel to the pitch axis of the spacecraft 600. Furthermore, the second extensible assemblies 622 have completed rotation about the second extensible assembly pivot axis 640, as shown by the black arrows.

Figure 6G:
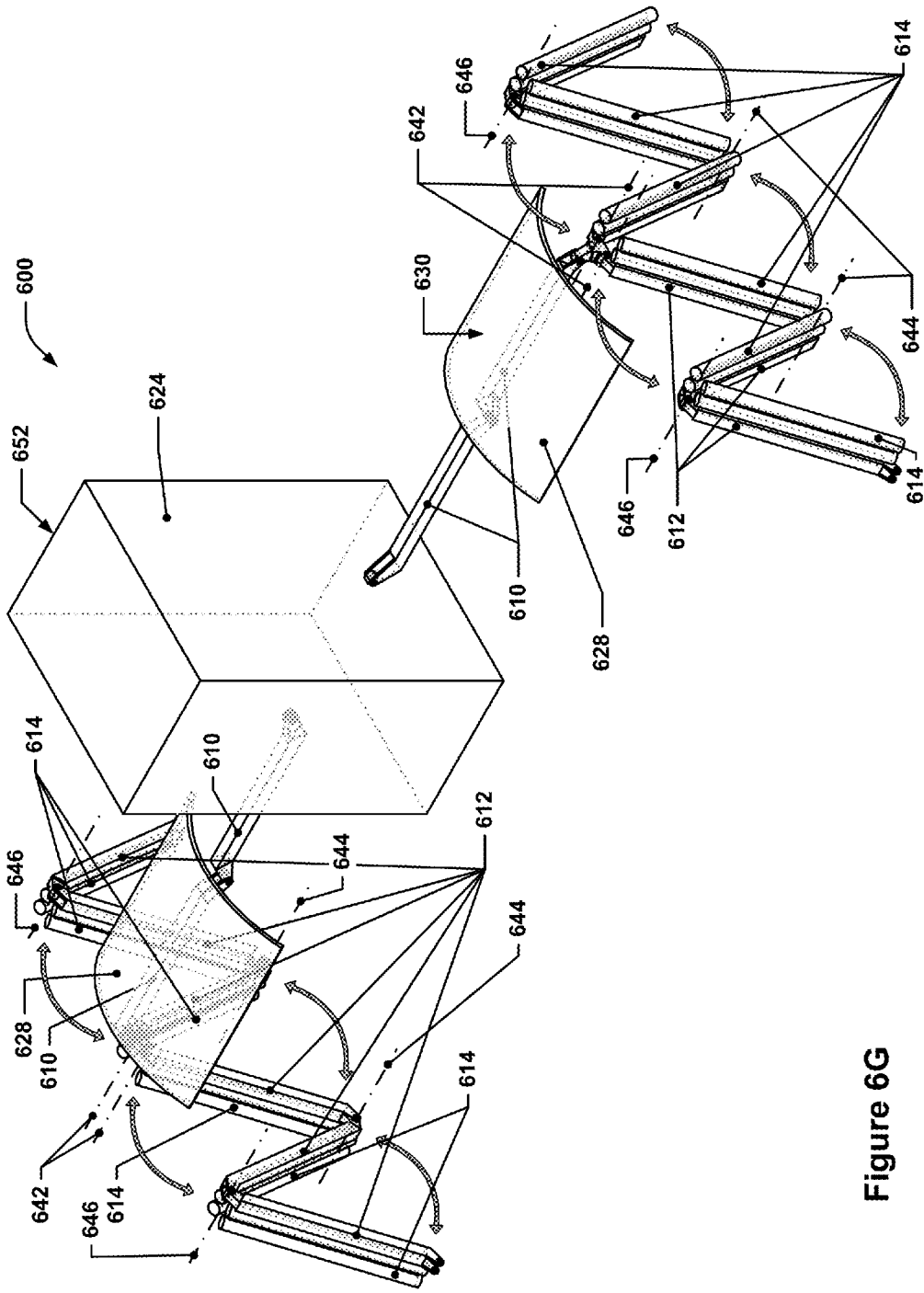
Figure 6H:
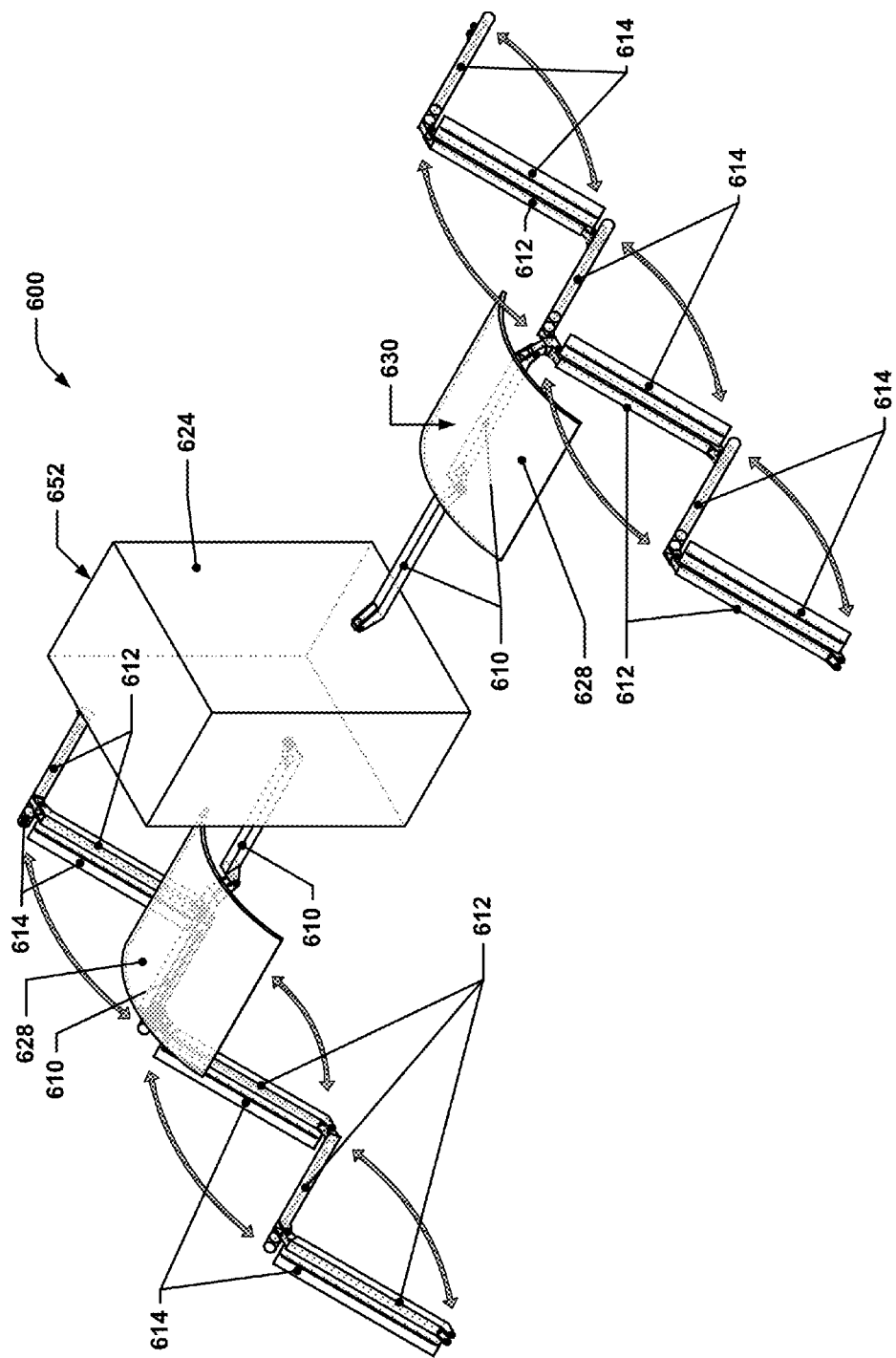
Figure 6I:
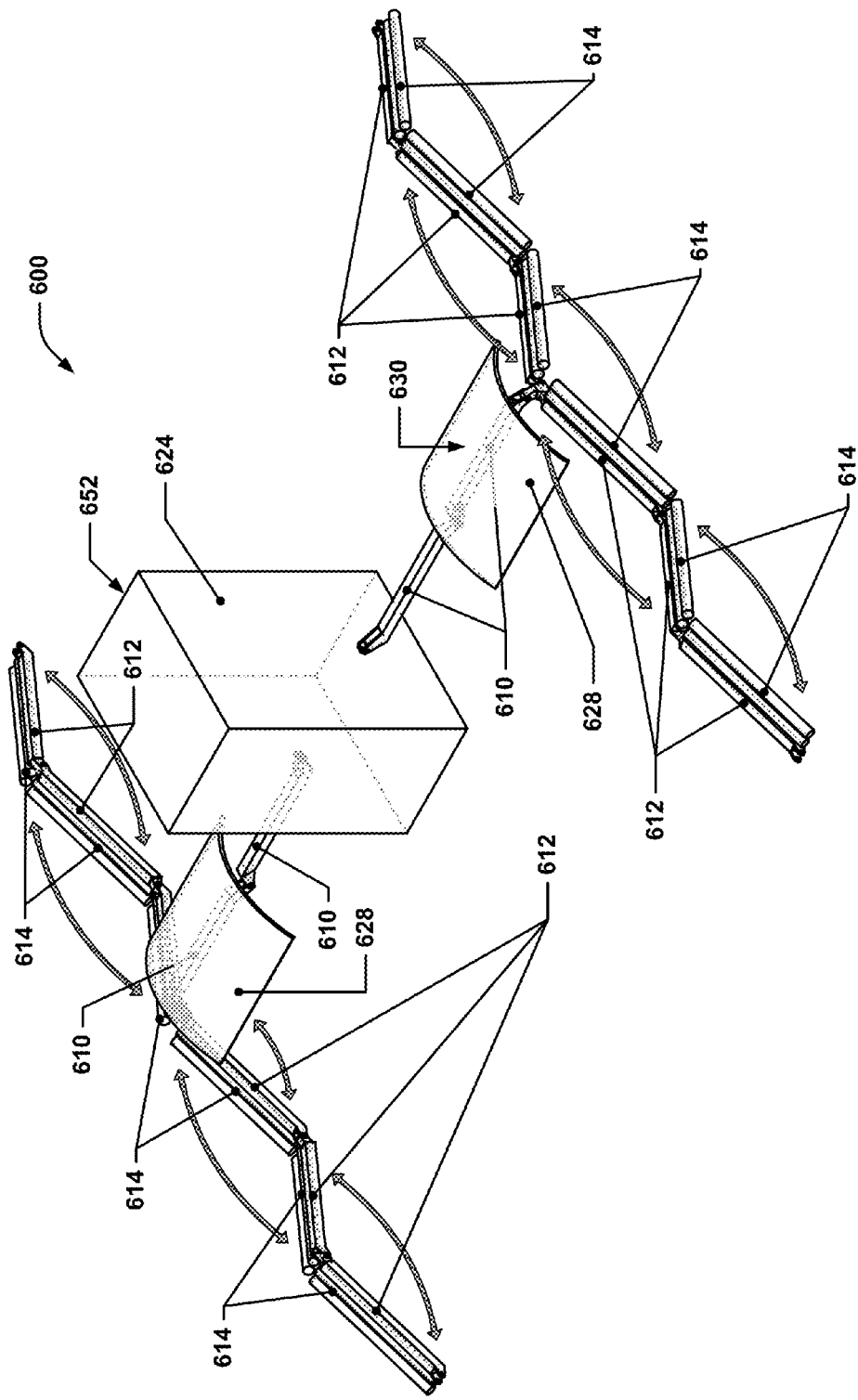

In FIG. 6G, the second extensible assemblies 622 are shown unfolding. During such movement, the array segments 612 closest to the distal ends 620 may rotate about first array segment pivot axes 642, the array segments 612 next closest to the distal ends 620 may rotate about second array segment pivot axes 644, the array segments 612 third closest to the distal ends 620 may rotate about third array segment pivot axes 646, and the array segments 612 furthest from the distal ends 620 may rotate about fourth array segment pivot axes 648 (the various array segment pivot axes are called out in FIG. 6E). Thus, the array segments 612 forming each of the second extensible assemblies 622 may be unfolded in a concertinaed fashion and the second extensible assemblies 622 may thereby be extended in a direction generally perpendicular to the long axes of the yoke segments or the pitch axis, e.g., parallel to the roll or yaw axes of the spacecraft 600. These unfolding rotations of the array segments 612 are indicated, at least in part, by grey arrows in FIG. 6G. FIGS. 6H and 6I depict further progressions of the second extensible assembly unfolding process.

Figure 6J:
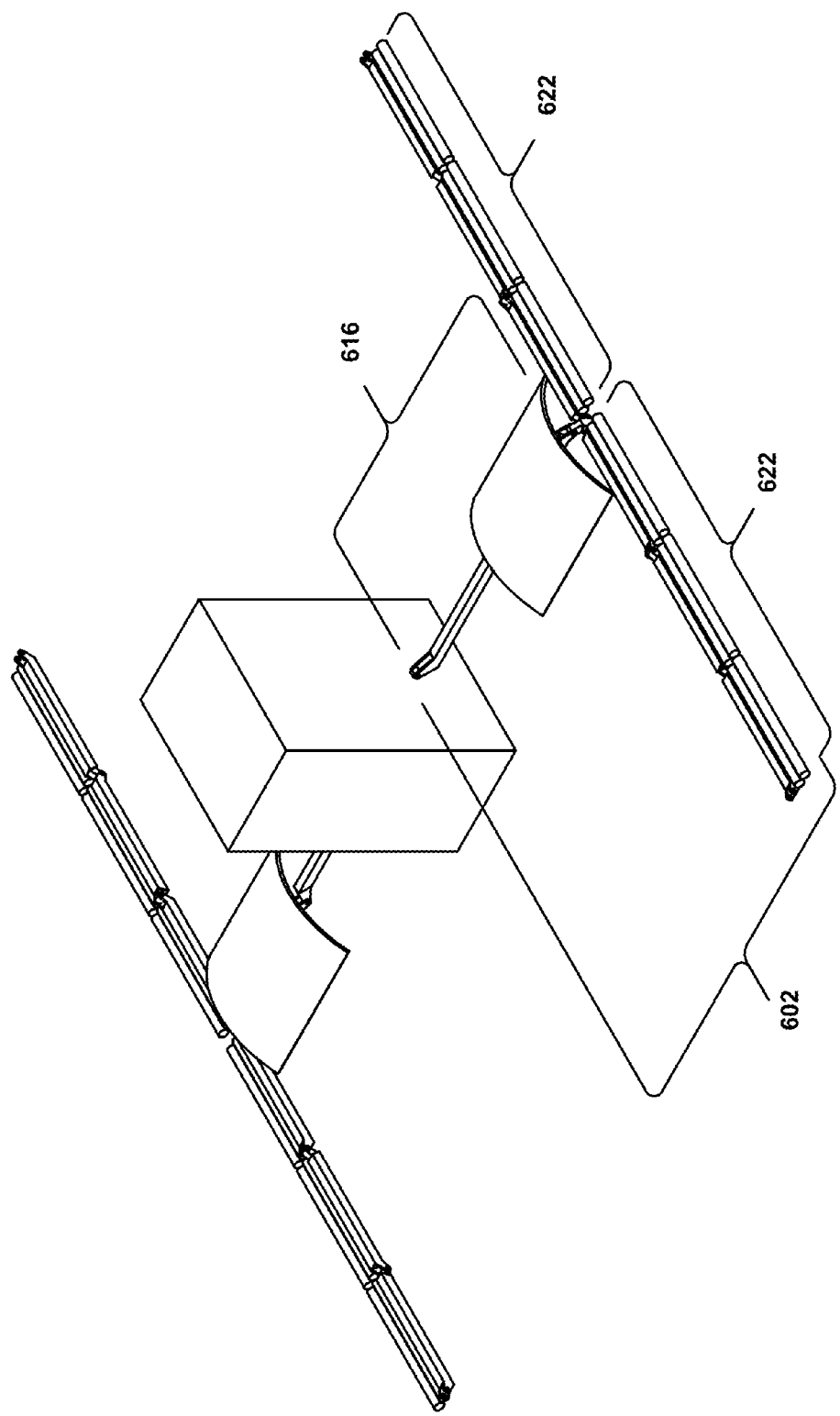

In FIG. 6J, the first extensible assemblies 616 have been completely extended and are substantially parallel to the pitch axis. In this particular implementation, this results in the first extensible assemblies 616 being substantially perpendicular to the sides 624 of the spacecraft 600. Additionally, the second extensible assemblies 622 are also completely extended in a direction substantially perpendicular to the pitch axis of the spacecraft 600. As can be seen, the second extensible assemblies 622 have been rotated about the second extensible assembly axes 640 such that the rollable solar panel units 614 are oriented facing away from the main body 652. It is to be understood that while the second extensible assemblies 622 are shown in a fully extended position that is substantially parallel to the roll axis, the first extensible assemblies 616 may be connected with the main body 652 via a rotatable mount that permits rotation of the first extensible assemblies 616, and thus the attached second extensible assemblies 622, about axes parallel to the pitch axis. Accordingly, the second extensible assemblies 622 may be rotated to be parallel to the yaw axis as well, or to any other position that is substantially perpendicular to the pitch axis. Such a rotatable mount may, alternatively, be incorporated into the first extensible assemblies 616 or the interfaces between the first extensible assemblies 616 and the second extensible assemblies 622.

Figure 6K:
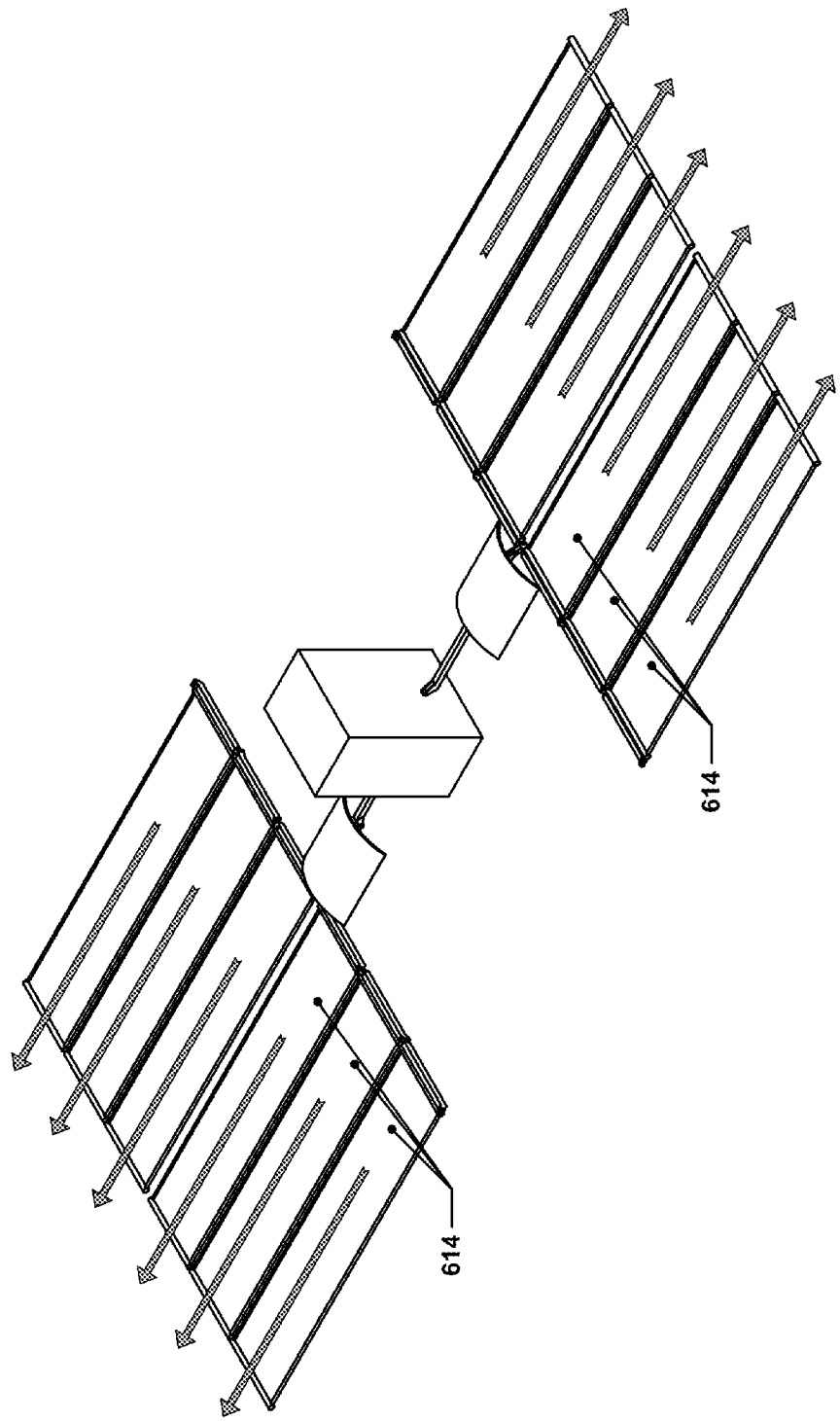
Figure 6L:
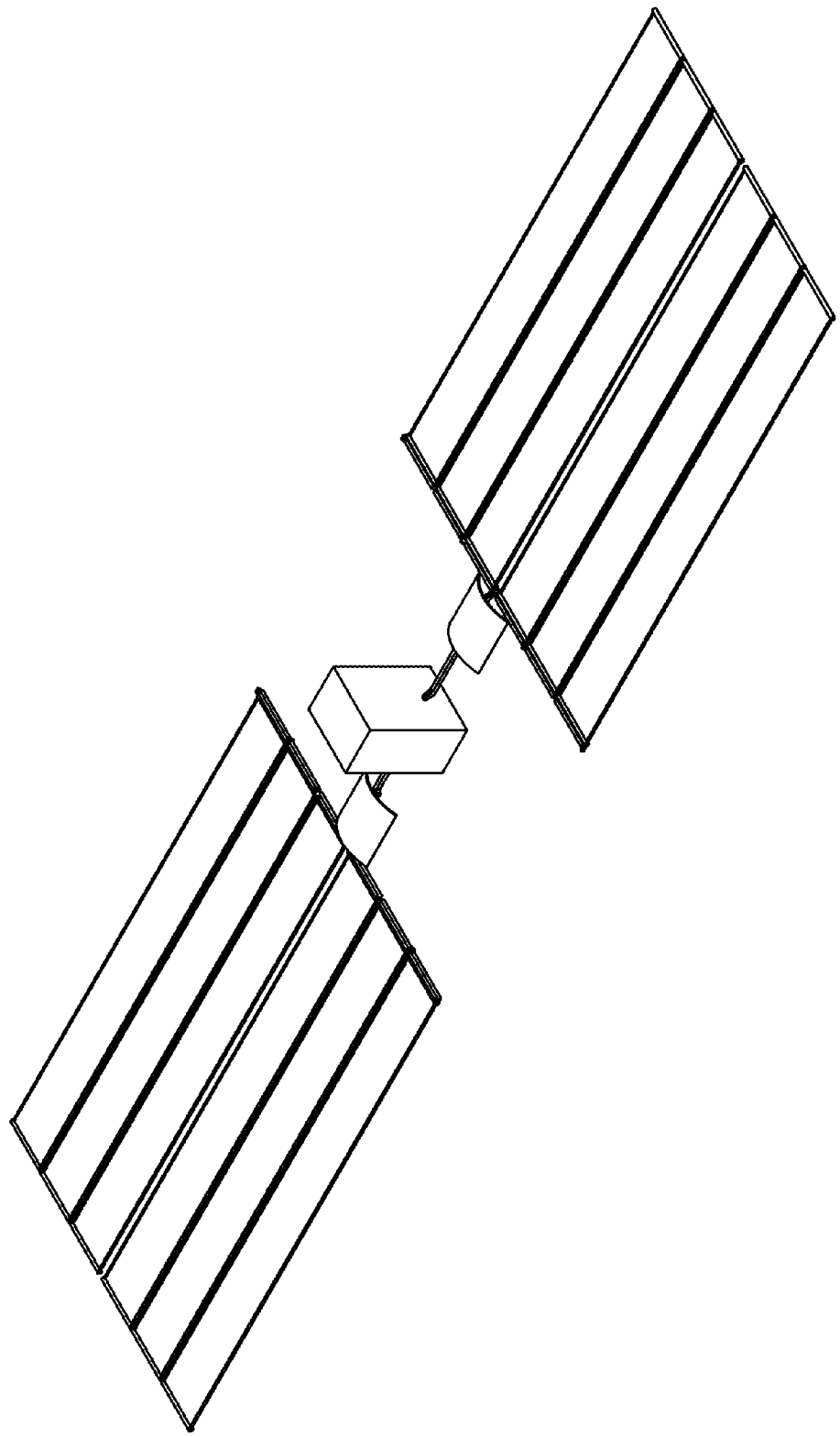
FIG. 6L depicts an isometric view of the spacecraft of FIG. 6A with the extensible solar arrays fully deployed.

In FIG. 6K, the rollable solar panel units 614 have been partially deployed. Such deployment, as discussed previously, generally involves unwinding the flexible solar panels of the rollable solar panel units 614 from the deployment spool and extending the flexible solar panels in the directions shown by the grey arrows. In FIG. 6L, the rollable solar panel units 614 are shown fully deployed. In this implementation, it is unnecessary to rotate the rigid solar panels 628 since they already face in the same direction as the rollable solar panel units 614.

Figure 7C:
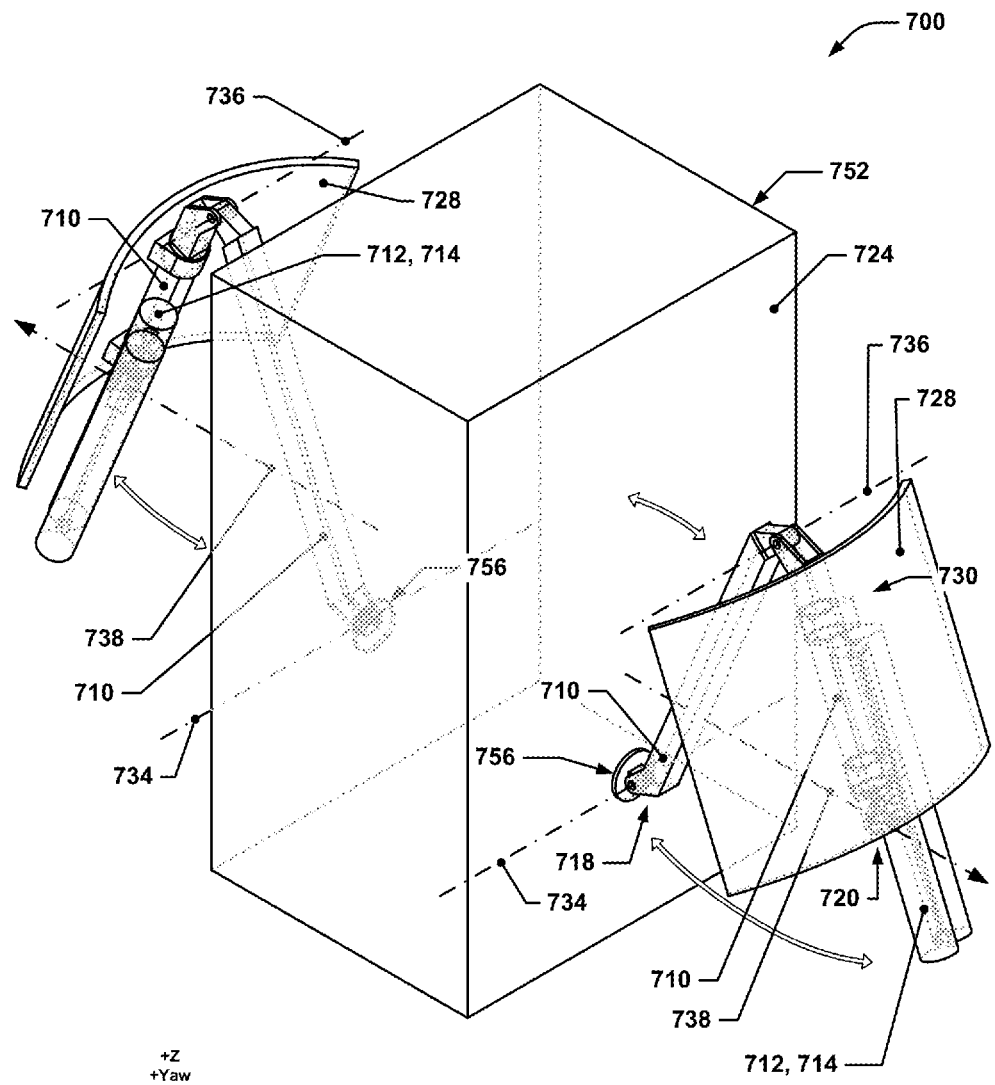
Figure 7D:
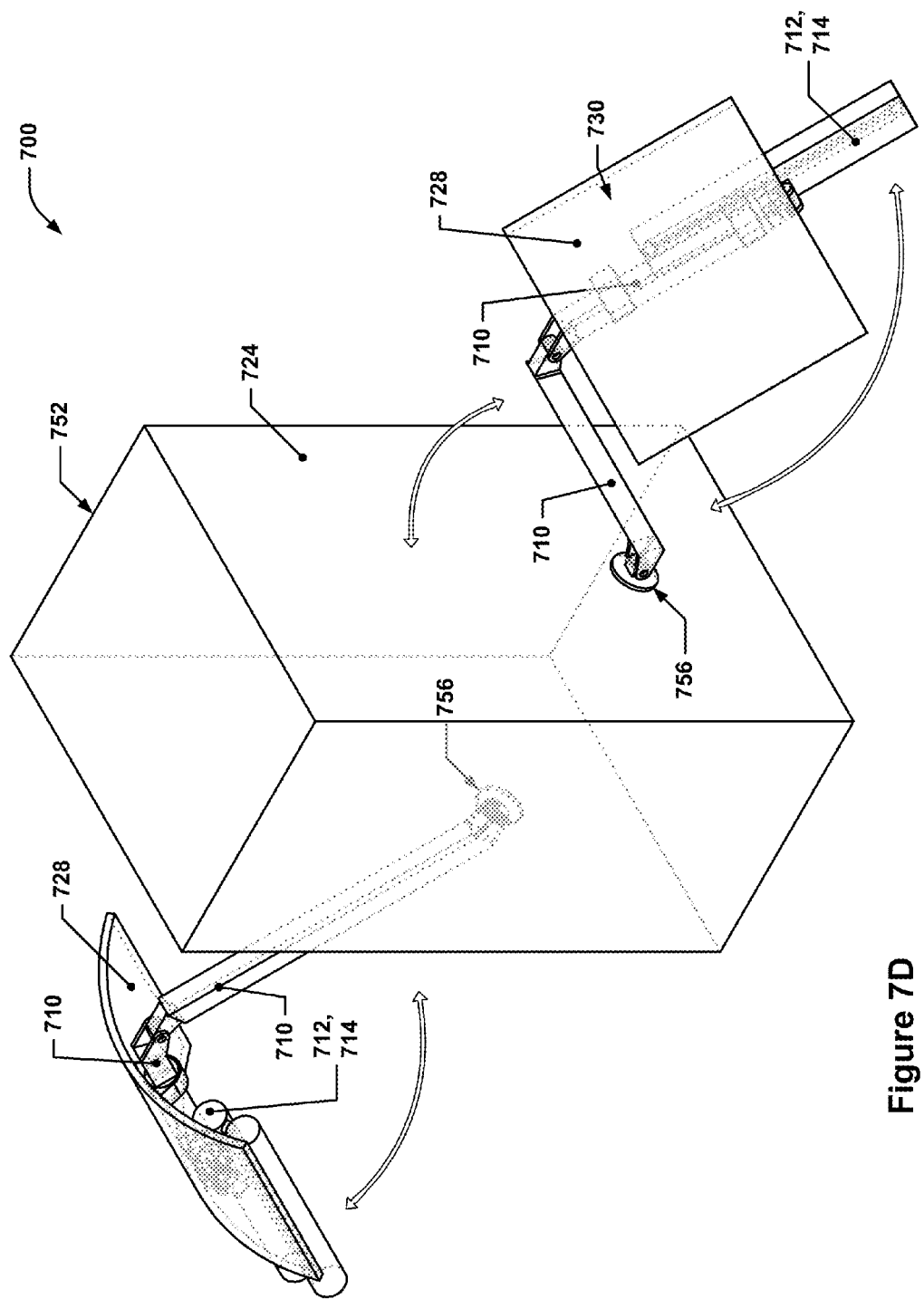
Figure 7E:
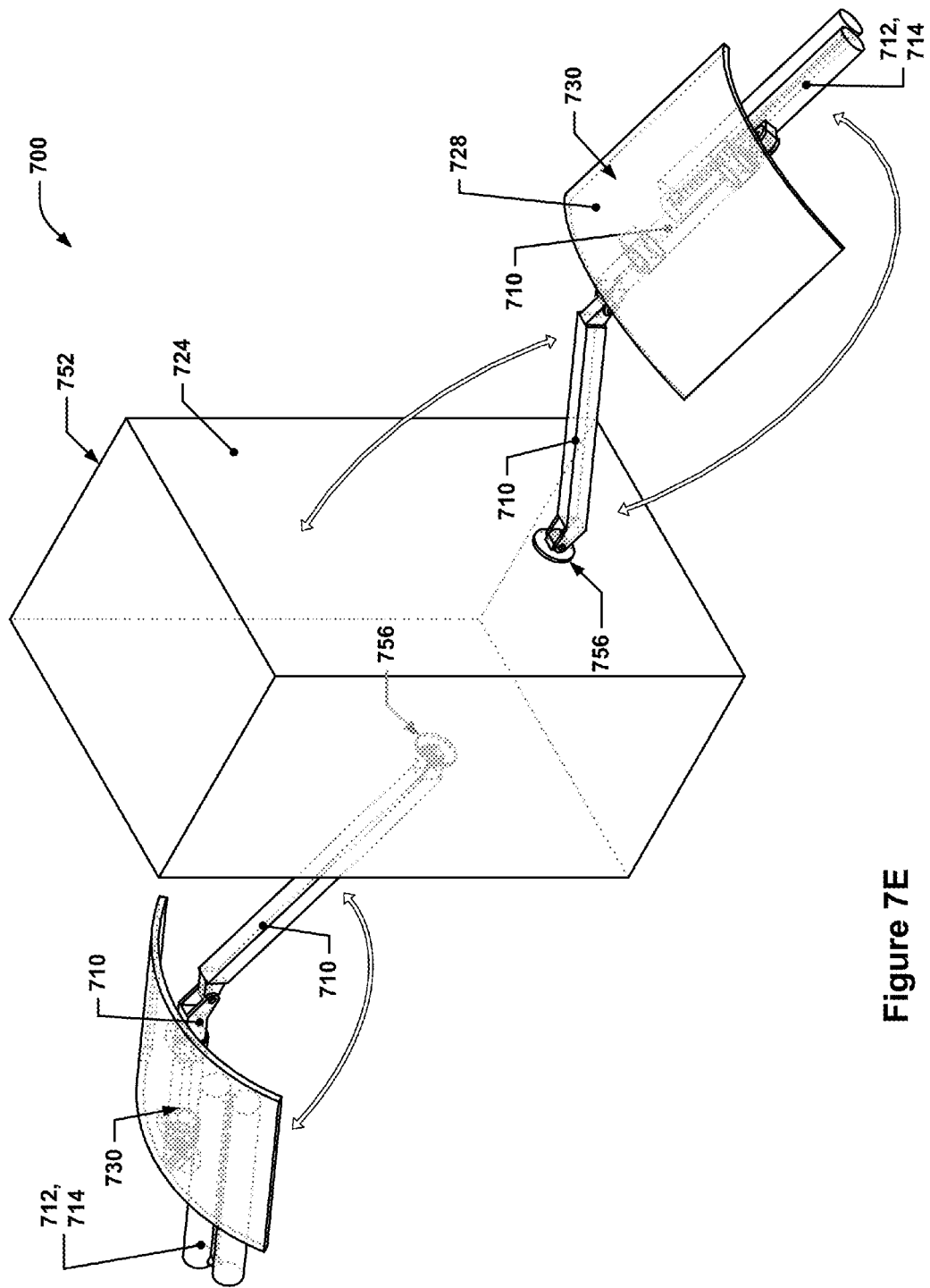

FIG. 7A depicts an isometric view of another example of a spacecraft featuring extensible solar arrays with the extensible solar arrays in the stowed position. FIG. 7B depicts a top view of the spacecraft of FIG. 7A and a circle indicating an example launch fairing envelope. FIGS. 7C-7L depict isometric views of the spacecraft of FIG. 7A with the extensible solar arrays in various stages of deployment. FIG. 7M depicts an isometric view of the spacecraft of FIG. 7A with the extensible solar arrays fully deployed. Like numbers are used in FIGS. 7A through 7L to depict similar structures. In some cases, not all components or features are indicated with callouts in all drawings, although it will be understood that any specific numbering of such components or features in other drawings is maintained in other Figures showing the same components or features without such specific callouts.

A spacecraft 700 is shown in FIGS. 7A through 7M. The spacecraft 700 may include a main body 752 and two extensible solar arrays 702 (see FIG. 7B) mounted to opposing sides 724 (only one side 724 is explicitly called out) of the main body 752. The extensible solar arrays 702 may each, in this case, include two yoke segments 710 and one array segment 712 (see FIGS. 7D through 7J for clearer views of the yoke segments 710 and the array segments 712). The yoke segments 710 for each of the extensible solar arrays 702 may be rotatably connected end-to-end to form a first extensible assembly 716, and the array segment 712 for each of the extensible solar arrays 702 may form a second extensible assembly 722 (see FIG. 7J). In some implementations, only one yoke segment 710 may be used and the first extensible assembly 716 may simply feature that single yoke segment 710.

Each array segment 712 may support a rollable solar panel unit 714. In the depicted implementation, the array segments 712 and the rollable solar panel units 714 are integrated units, with the rollable solar panel units 714 housed within the structure of the array segments 712.

In addition to the rollable solar panel units, the extensible solar arrays 702 may also each include one or more rigid solar panels 728 that are mounted to one of the yoke segments 710. As discussed with respect to FIGS. 4A through 4I, such rigid solar panels 702 are optional, but their inclusion may provide certain advantages. The rigid solar panels 728 may provide a means for generating solar power even when the rollable solar panel units 714 are in the retracted state.

The first extensible assembly 716 and second extensible assembly 722 for one of the extensible solar arrays 702 may be connected together and may fold up into a stowed configuration (when the rollable solar panel unit 714 is in a retracted state). The stowed configuration is shown in FIGS. 7A and 7B. As can be seen, in the stowed configuration, the yoke segments 710 and the array segments 712 are all positioned with their long axes substantially parallel with the yaw axis of the spacecraft 700. In the depicted implementation, the yoke segments 710 and the array segment 712/rollable solar panel unit 714 of each of the extensible solar arrays 702 are interposed between the sides 724 of the main body 752 and the rigid solar panels 728 in the stowed configuration. The rigid solar panels 728 may have solar power-generating surfaces 730 that face away from the main body 752 in the stowed configuration. The solar power-generating surfaces 730 may thus be largely unobstructed by other components of the spacecraft 700 and may be capable of providing photovoltaic power to the spacecraft 700 when the extensible solar arrays are in the stowed configuration. The rigid solar panels 728 may also be curved so as to fit within a launch fairing envelope 732. Planar rigid solar panels 728 may be used as well, but may need to be smaller to avoid violating the launch fairing envelope 732.

In FIG. 7C, the extensible solar arrays 702 have begun deploying. As can be seen, the yoke segments 710 closest to the main body 752 have started to rotate about first yoke pivot axes 734 and the remaining yoke segments 710 have started to rotate with respect to second yoke pivot axes 736. As a result of these rotations, each of the first extensible assemblies 716 have started to extend along yoke extension axes 738. This causes distal ends 720 of the first extensible assemblies 716 to move away from proximal ends 718 of the first extensible assemblies 716. These rotational motions (partially indicated by the white arrows in FIG. 7C) may be driven by motors, sprung hinge mechanisms, pulleys, or other actuation systems. Such deployment motion is continued in FIGS. 7D and 7E.

Figure 7F:
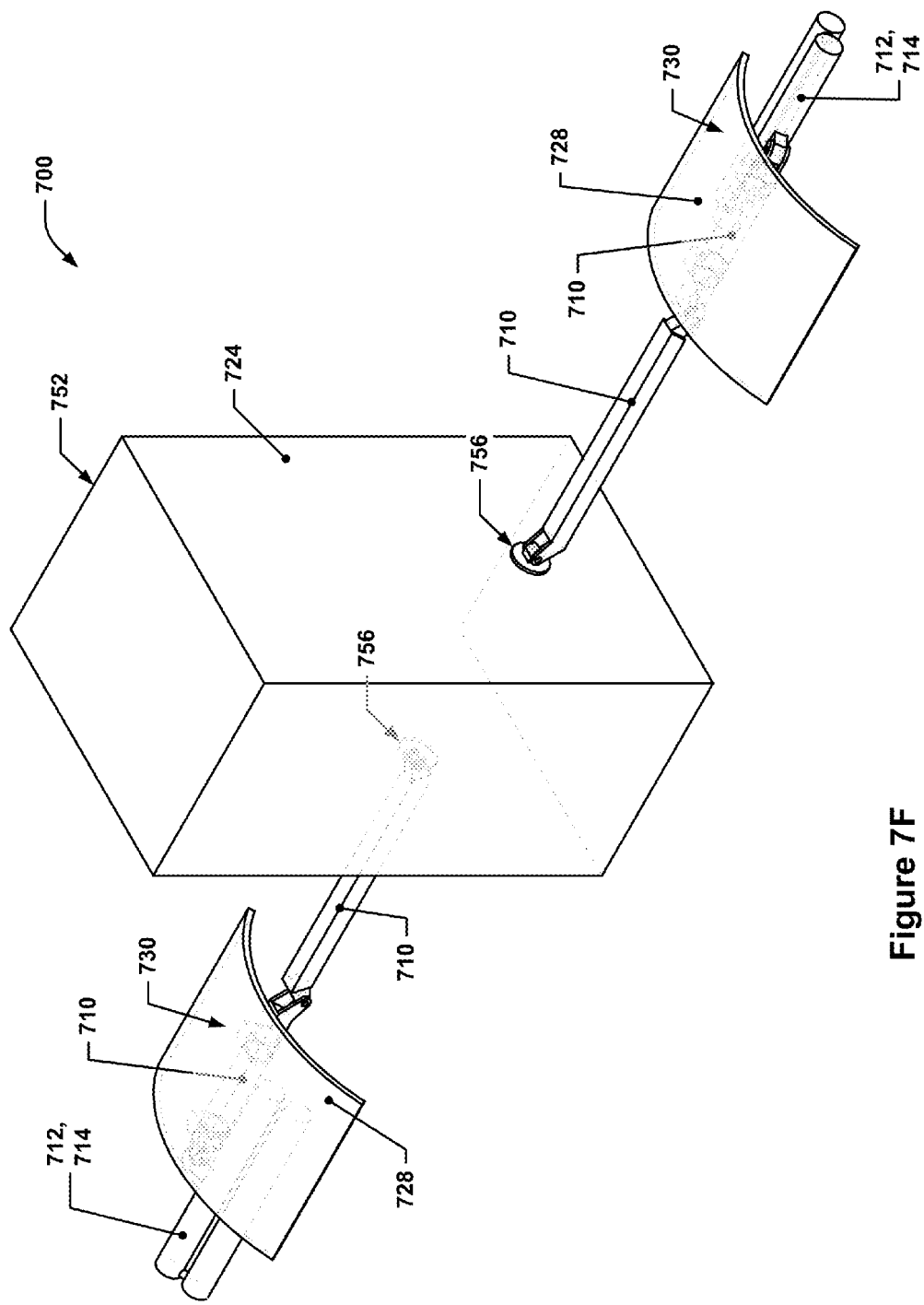
Figure 7G:
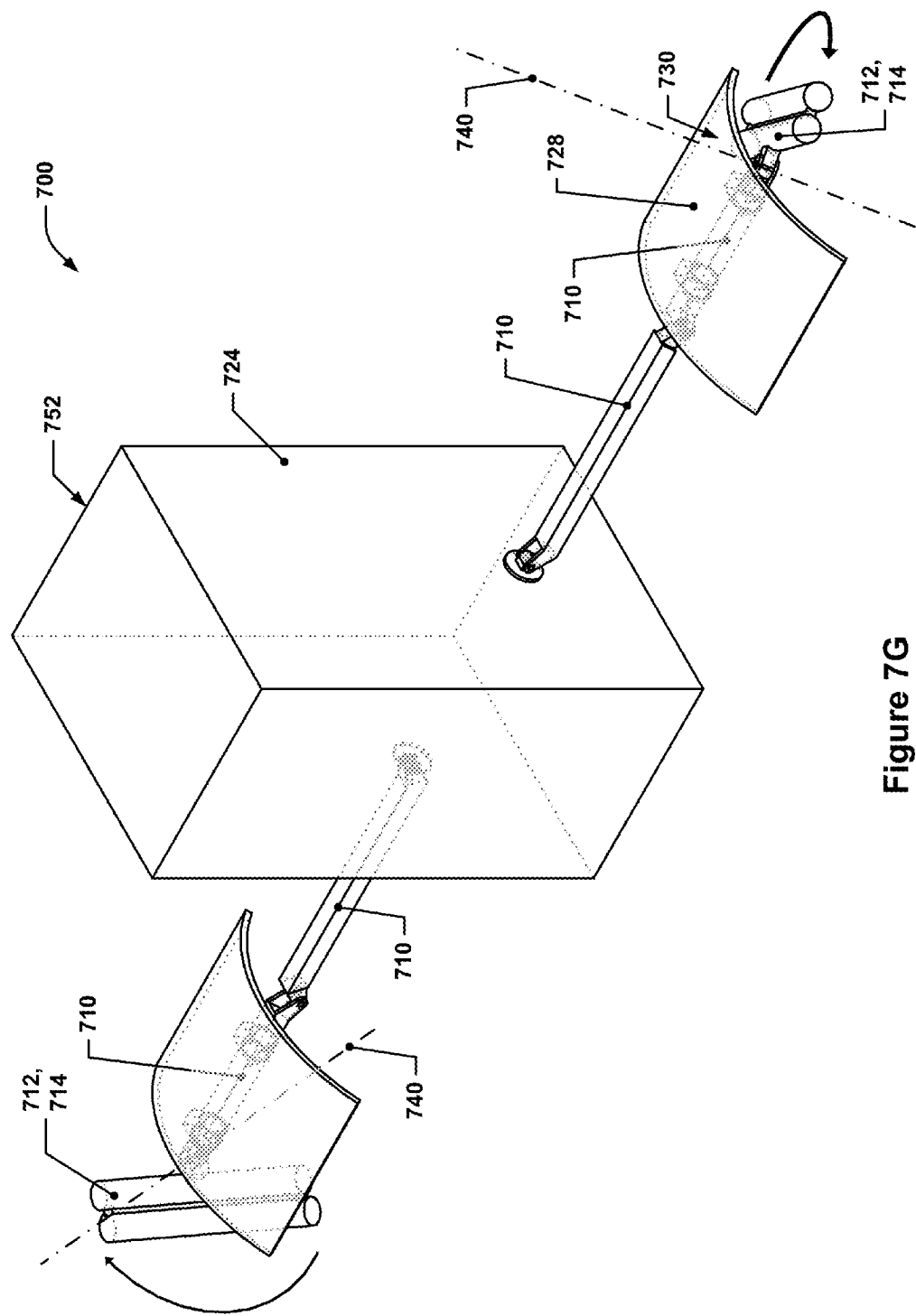
Figure 7H:
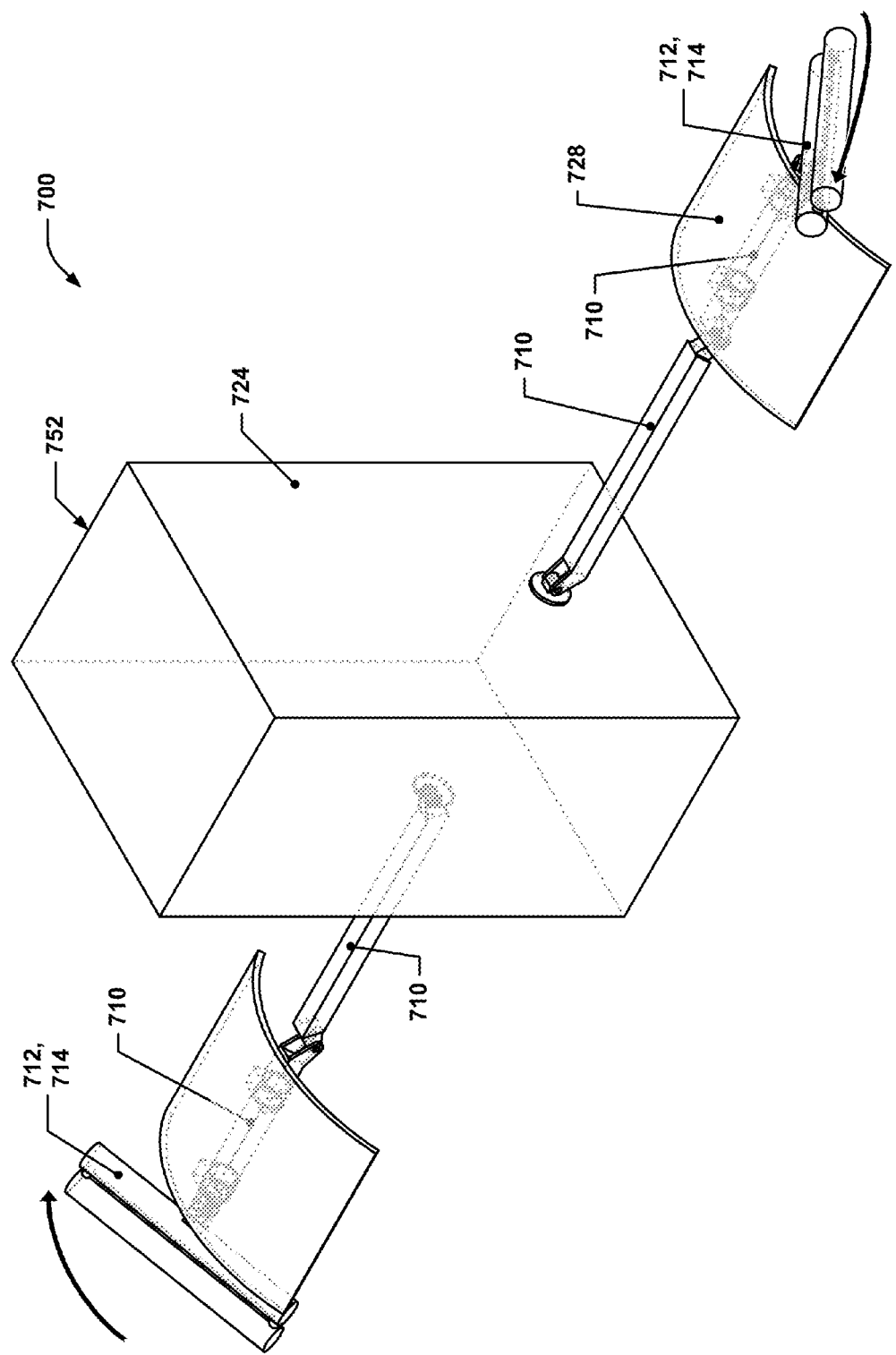

In FIG. 7F, the first extensible assemblies 716 have completely deployed. In FIG. 7G, the second extensible assemblies 722 have started rotating about second extensible assembly pivot axes 740. This rotational motion is indicated by the black arrows in FIG. 7G. While the rotation of the second extensible assemblies 722 is shown as occurring after the first extensible assemblies 716 have completely extended, in practice, the first extensible assemblies 716 and the second extensible assemblies 722 may, alternatively, unfold simultaneously, or at least partially simultaneously. In FIG. 7H, the rotation of the second extensible assemblies 722 about the second extensible assembly pivot axes 740 may continue until the array segments 712 are substantially perpendicular to the pitch axis of the spacecraft 700, as shown in FIG. 7I.

Figure 7I:
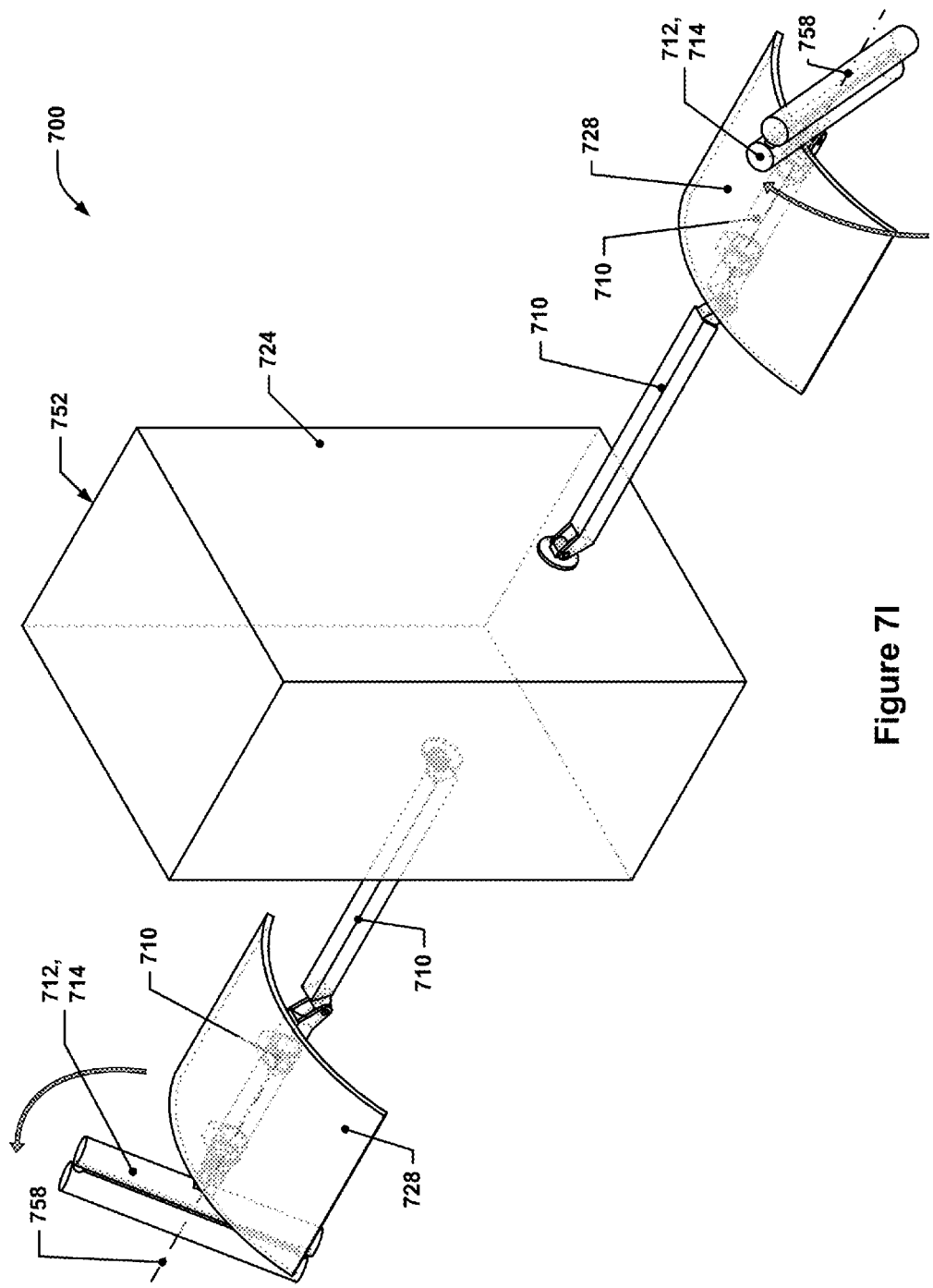
Figure 7J:
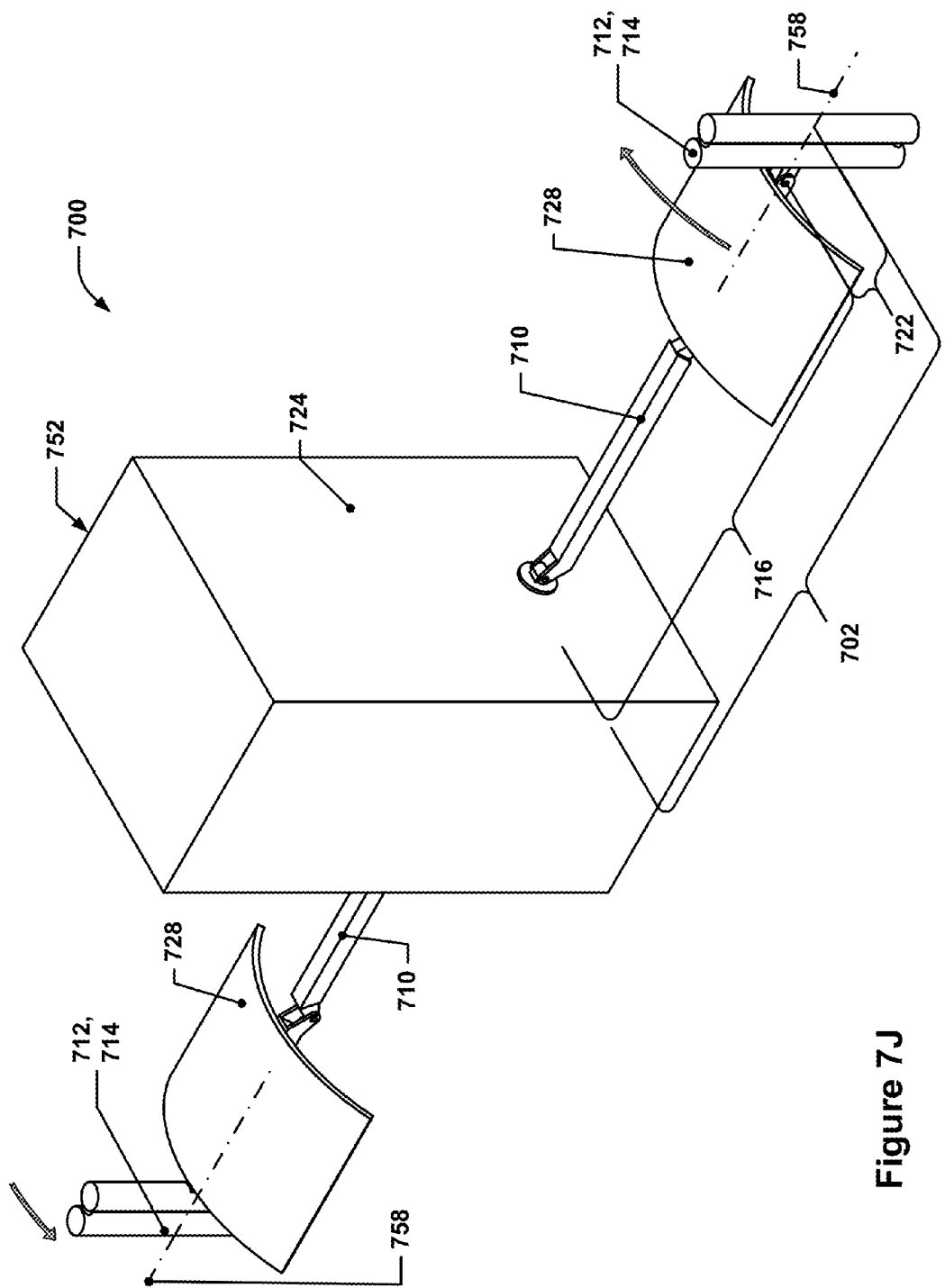
Figure 7K:
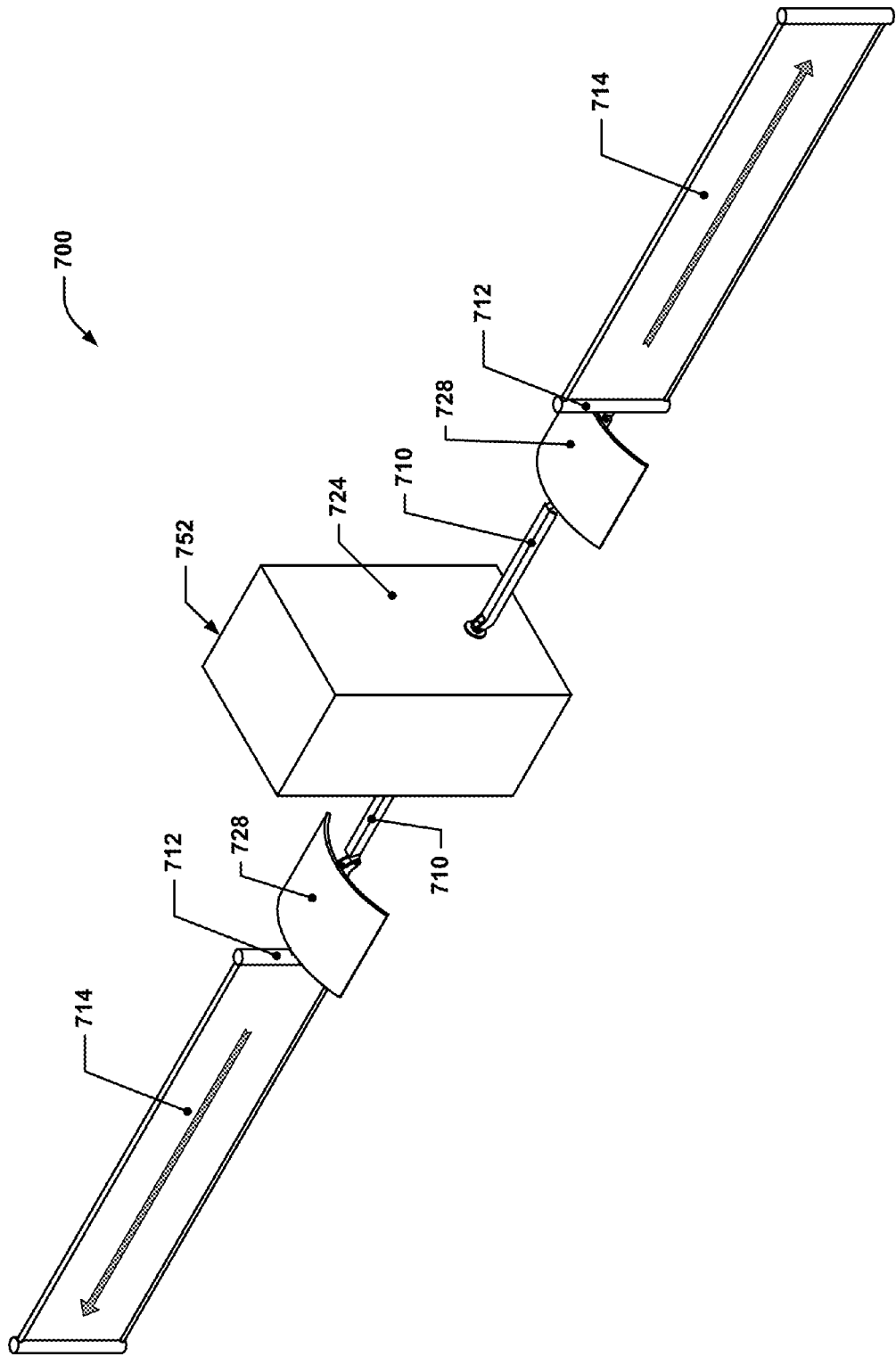
Figure 7M:
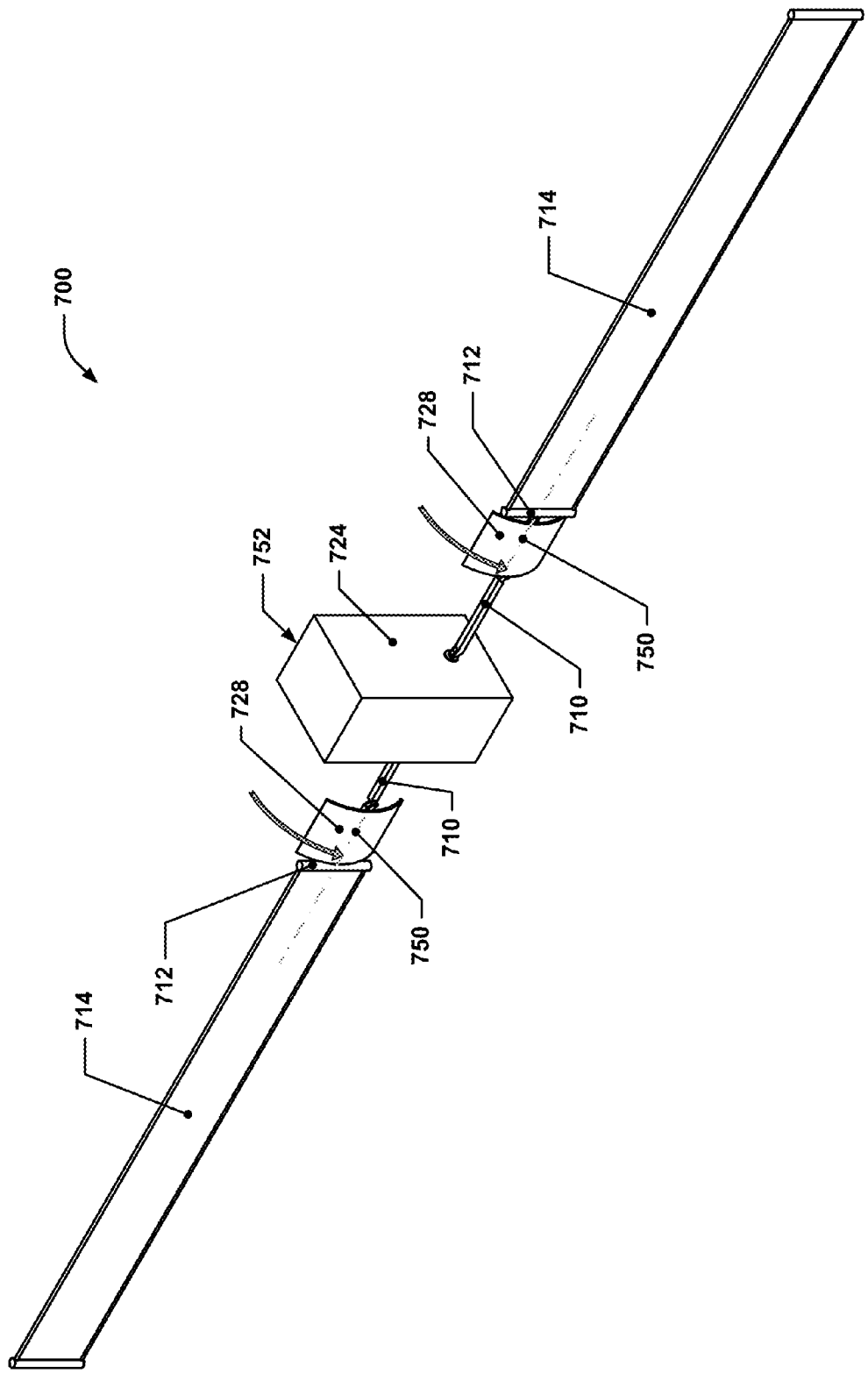
FIG. 7M depicts an isometric view of the spacecraft of FIG. 7A with the extensible solar arrays fully deployed.

In FIG. 7I, as noted above, the first extensible assemblies 716 are fully deployed, i.e., the yoke segments 710 are substantially parallel to the pitch axis of the spacecraft 700, and the second extensible assemblies 722 have rotated so as to be substantially perpendicular to the pitch axis of the spacecraft 700. The second extensible assemblies 722 may then be rotated about rotation axes 758, as is further shown in FIG. 7J. Once the second extensible assemblies 722 are finally positioned, the rollable solar panel units 714 may be extended, as is shown in FIGS. 7K and 7L. The rigid solar panels 728 may also be rotated about rigid panel pivot axes 750 so as to be substantially aligned with the rollable solar panel units 714, as shown in FIG. 7M.

Once deployed, the extensible solar arrays 702 may be rotated about an axis parallel to the pitch axis via the rotatable mount 756 (see FIG. 7A). It is to be understood that such rotation may obviate the steps of rotating the second extensible assemblies 722 about the rotation axes 758. Instead, the rigid solar panels 728, if present, may simply be rotated about the rigid panel pivot axes 750 until the rigid solar panels 728 are aligned with the rollable solar panel units 714. The entire extensible solar array 702 may then be rotated via rotatable mount 756 to bring the solar panels into a desired orientation.

Figure 8:
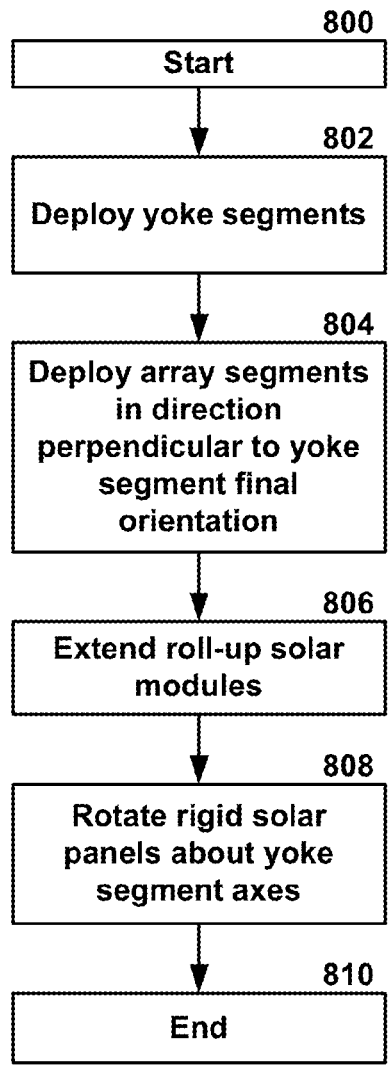
FIG. 8 depicts a flow diagram for one technique for using an extensible solar array similar to those discussed with respect to FIGS. 4A through 7M.

FIG. 8 depicts a flow diagram showing one technique for implementing an extensible solar array as discussed herein. In block 800, the technique may begin. In block 802, the yoke segments may be deployed from a stowed configuration to a deployed configuration, i.e., to a position substantially perpendicular to the stowed position of the yoke segments. In block 804, the array segments may be moved to a deployed position that is, or will be, substantially perpendicular to the final orientation of the yoke segments in the deployed configuration. In block 806, rollable solar panel units integrated with or connected to the array segments may be deployed by unwinding flexible solar panels from deployment spools of the rollable solar panel units. In block 808, a rigid solar panel mounted to the yoke segment may be rotated so as to be oriented in the same direction as the rollable solar panel units. The technique may end in block 810. It is to be understood that there may be other actions taken before or after the blocks shown in FIG. 8, and that the various operations shown in the various blocks may be performed in a different order. Additionally, some or all of the operations shown in the various blocks may be performed simultaneously or partially simultaneously with one another.

As can be seen, in all three of the implementations discussed above with reference to FIGS. 4A through 7M, the yoke segments and array segments for an extensible solar array may be articulated such that they may be transitioned between a folded, stowed configuration and an unfolded, deployed configuration. In the stowed configuration, the yoke segments and array segments may be positioned to be substantially parallel with one another, e.g., parallel to the yaw axis of the spacecraft to which they are, or will be, mounted. In the deployed configuration, the yoke segments may be positioned in an orientation substantially perpendicular to the orientation the yoke segments were in in the stowed configuration, e.g., substantially parallel to the pitch axis of the spacecraft to which they are, or will be, mounted, and the array segments may be substantially perpendicular to the yoke segment orientation, e.g., substantially perpendicular to the pitch axis of the spacecraft to which they are, or will be, mounted.

There are a myriad of ways in which such an extensible solar array may be implemented, and the examples shown in FIGS. 4A through 7M are representative of only some of the possible implementations of such extensible solar arrays. Other implementations of extensible solar arrays featuring different quantities of yoke segments, array segments, articulations, etc. that provide for stowed and deployed configurations such as those discussed above are also considered to be within the scope of this disclosure.

It is to be understood that while the discussion above references multiple yoke segments and array segments, extensible solar arrays according to the concepts described herein may also include implementations with a single yoke segment, a single array segment, or both.

The various structures discussed above may be provided using any of a variety of environment-appropriate materials and geometries. For example, the yoke segments and array segments may be made in the form of tubes, rods, trusses, or other structures capable of supporting cantilevered loads. Such structures may be made from metals, e.g., aluminum or titanium, composites, or other suitable materials.

The various segments discussed above may be connected with one another via any of a variety of different rotational joints. For example, spring-loaded locking hinges may be used to connect together various array segments to form a second extensible assembly. Alternatively, servomotor joints may be used to connect together such array segments, although this may increase complexity, cost, and weight over a second extensible assembly that uses sprung hinges.

As discussed above, the various movements of the yoke segments and the array segments may be coordinated so as to occur simultaneously or in a staggered fashion. Such timing may be achieved through the use of computer-controlled release mechanisms or motor actuations or by passive mechanical means, e.g., sprung locking latches configured to release other sprung latches after travelling a sufficient distance. Examples of such sprung latches and release mechanisms may be found in U.S. Pat. No. 6,010,096 to Varouj Baghdasarian.

Although several implementations of this invention have been described in detail herein with reference to the accompanying drawings, it is to be understood that the invention is not limited to these precise implementations, and that various changes and modifications may be effected therein by one skilled in the art without departing from the scope or spirit of the invention as defined in the appended claims.

What is claimed is:
1. An extensible boom structure comprising:
at least one yoke segment, each yoke segment having a yoke axis extending between a first end of the yoke segment and a second end of the yoke segment;

a rigid solar panel with a solar power-generating surface; and at least one array segment, each array segment having an array segment axis extending between a first end of the array segment and a second end of the array segment, wherein:

the at least one yoke segment forms a first extensible assembly with a proximal end and a distal end, the at least one array segment forms at least one second extensible assembly, the proximal end of the first extensible assembly is configured to be rotatably connected with a side of a spacecraft, the spacecraft having a pitch axis, a roll axis, and a yaw axis that are all orthogonal to one another, the at least one second extensible assembly is rotatably connected with the first extensible assembly at the distal end of the first extensible assembly, the at least one yoke segment and the at least one array segment are movable from a stowed configuration to a deployed configuration, wherein the extensible boom structure is configured such that when the proximal end of the first extensible assembly is connected with the side of the spacecraft and is in the deployed configuration, the at least one yoke segment is substantially aligned with the pitch axis and extends away from the spacecraft and each array segment axis is substantially perpendicular to the pitch axis, the rigid solar panel is mounted to one of the at least one yoke segment, and the solar power-generating surface faces away from the spacecraft when the extensible boom structure is mounted to the side of the spacecraft and is in the stowed configuration.

2. The extensible boom structure of claim 1, further comprising one or more rollable solar panel units, each rollable solar panel unit connected with one of the at least one array segment such that the rollable solar panel unit moves with the array segment with which the rollable solar panel unit is connected.

3. The extensible boom structure of claim 1, wherein at least one of the at least one second extensible assembly includes at least two array segments that:

are rotatably connected end-to-end, unfold in a concertinaed manner during movement from the stowed configuration to the deployed configuration, and are substantially in-line with one another and arranged end-to-end in the deployed configuration.

4. The extensible boom structure of claim 3, wherein:

there are two second extensible assemblies, one of the two second extensible assemblies is configured to unfold in a first direction substantially perpendicular to the yoke axis of the yoke segment closest to the distal end, and the other of the two second extensible assemblies is configured to unfold in a second direction opposite the first direction.

5. The extensible boom structure of claim 1, wherein the rigid solar panel is mounted to the yoke segment that is furthest from the side of the spacecraft when the extensible boom structure is in the stowed configuration.

6. The extensible boom structure of claim 1, wherein the at least one array segment includes only one array segment and the rigid solar panel is rotatably mounted to the yoke segment so as to be rotatable about an axis substantially parallel to the yoke axis of the yoke segment when in the deployed configuration.

7. A spacecraft comprising:

a main body, the main body having a yaw axis, a roll axis, and a pitch axis that are all mutually orthogonal to one another;

a first extensible boom structure including:

at least one yoke segment, each yoke segment having a yoke axis extending between a first end of the yoke segment and a second end of the yoke segment;

a rigid solar panel with a solar power-generating surface; and at least one array segment, each array segment having an array segment axis extending between a first end of the array segment and a second end of the array segment, wherein:

the at least one yoke segment forms a first extensible assembly with a proximal end and a distal end, the at least one array segment forms at least one second extensible assembly, the proximal end of the first extensible assembly is rotatably connected with a first side of the main body, the at least one second extensible assembly is rotatably connected with the first extensible assembly at the distal end of the first extensible assembly, the at least one yoke segment and the at least one array segment are movable from a stowed configuration to a deployed configuration, wherein, when the first extensible boom structure is in the deployed configuration, the at least one yoke segment is substantially aligned with the pitch axis and each array segment axis is substantially perpendicular to the pitch axis, the rigid solar panel is mounted to one of the at least one yoke segment, and the solar power-generating surface faces away from the spacecraft when the first extensible boom structure is in the stowed configuration.

8. The spacecraft of claim 7, further comprising a second extensible boom structure substantially the same as the first extensible boom structure wherein the proximal end of the first extensible assembly of the second extensible boom structure is rotatably connected with a second side of the spacecraft opposite the first side.

9. The spacecraft of claim 7, further comprising at least one rollable solar panel unit, wherein the at least one rollable solar panel unit:

includes a flexible solar power-generating element and a deployment spool configured to rotate about a roll-up axis of the rollable solar panel unit, is configured to deploy the flexible solar power-generating element along an extension axis substantially perpendicular to the roll-up axis, and is connected with one of the array segments such that the roll-up axis of the rollable solar panel unit is substantially parallel to the array segment axis of the array segment.

10. The spacecraft of claim 9, wherein the flexible solar power-generating element is:

wound around the deployment spool when the first extensible boom structure is in the stowed configuration, and substantially unwound from the deployment spool and extended along the extension axis in a direction substantially normal to the first side of the main body when the first extensible boom structure is in the deployed configuration.

11. The spacecraft of claim 7, wherein each second extensible assembly includes a plurality of array segments that:
are rotatably connected end-to-end,
unfold in a concertinaed manner during movement from the stowed configuration to the deployed configuration, and
are substantially in line with one another and arranged end-to-end in the deployed configuration.

12. The spacecraft of claim 11, wherein:
the first extensible boom structure includes two second extensible assemblies,
one of the two second extensible assemblies is configured to unfold in a first direction substantially perpendicular to the at least one yoke segment, and
the other of the two second extensible assemblies is configured to unfold in a second direction opposite the first direction.

13. The spacecraft of claim 7, wherein the at least one array segment includes only one array segment and the rigid solar panel is rotatably mounted to the yoke segment so as to be rotatable about an axis substantially parallel to the yoke axis of the yoke segment when in the deployed configuration.

14. An extensible boom structure comprising:
at least one yoke segment, each yoke segment having a yoke axis extending between a first end of the yoke segment and a second end of the yoke segment; and
at least three array segments, each array segment having an array segment axis extending between a first end of the array segment and a second end of the array segment, wherein:
the at least one yoke segment forms a first extensible assembly with a proximal end and a distal end,
the at least three array segments form two second extensible assemblies, one second extensible assembly having at least one array segment and the other second extensible assembly having at least two array segments that are rotatably connected end-to-end, that unfold in a concertinaed manner during movement from the stowed configuration to the deployed configuration, and that are substantially in-line with one another and arranged end-to-end in the deployed configuration,
one of the two second extensible assemblies is configured to unfold in a first direction substantially perpendicular to the yoke axis of the yoke segment closest to the distal end,
the other of the two second extensible assemblies is configured to unfold in a second direction opposite the first direction,
the proximal end of the first extensible assembly is configured to be rotatably connected with a side of a spacecraft, the spacecraft having a pitch axis, a roll axis, and a yaw axis that are all orthogonal to one another,
each of the second extensible assemblies is rotatably connected with the first extensible assembly at the distal end of the first extensible assembly, and
the at least one yoke segment and the at least one array segment are movable from a stowed configuration to a deployed configuration, wherein the extensible boom structure is configured such that when the proximal end of the first extensible assembly is connected with the side of the spacecraft and is in the deployed configuration, the at least one yoke segment is substantially aligned with the pitch axis and extends away from the spacecraft and each array segment axis is substantially perpendicular to the pitch axis.

15. The extensible boom structure of claim 14, the extensible boom structure further comprising a rigid solar panel with a solar power-generating surface, wherein:
the rigid solar panel is mounted to one of the at least one yoke segment, and
when the extensible boom structure is mounted to the side of the spacecraft and is in the stowed configuration, the solar power-generating surface faces away from the spacecraft.

16. The extensible boom structure of claim 15, wherein the at least one array segment includes only one array segment and the rigid solar panel is rotatably mounted to the yoke segment so as to be rotatable about an axis substantially parallel to the yoke axis of the yoke segment when in the deployed configuration.

17. The extensible boom structure of claim 14, further comprising one or more rollable solar panel units, each rollable solar panel unit connected with one of the at least one array segment such that the rollable solar panel unit moves with the array segment with which the rollable solar panel unit is connected.

18. The extensible boom structure of claim 14, wherein at least one of the at least one second extensible assembly includes at least two array segments that:
are rotatably connected end-to-end,
unfold in a concertinaed manner during movement from the stowed configuration to the deployed configuration, and
are substantially in-line with one another and arranged end-to-end in the deployed configuration.

19. A spacecraft comprising:
a main body, the main body having a yaw axis, a roll axis, and a pitch axis that are all mutually orthogonal to one another;
a first extensible boom structure including:
at least one yoke segment, each yoke segment having a yoke axis extending between a first end of the yoke segment and a second end of the yoke segment; and
at least three array segments, each array segment having an array segment axis extending between a first end of the array segment and a second end of the array segment, wherein:
the at least one yoke segment forms a first extensible assembly with a proximal end and a distal end,
the at least three array segments form two second extensible assemblies, one second extensible assembly having at least one array segment and the other second extensible assembly having at least two array segments that are rotatably connected end-to-end, that unfold in a concertinaed manner during movement from the stowed configuration to the deployed configuration, and that are substantially in-line with one another and arranged end-to-end in the deployed configuration,
one of the two second extensible assemblies is configured to unfold in a first direction substantially perpendicular to the yoke axis of the yoke segment closest to the distal end,
the other of the two second extensible assemblies is configured to unfold in a second direction opposite the first direction,
the proximal end of the first extensible assembly is rotatably connected with a first side of the main body, each of the second extensible assemblies is rotatably connected with the first extensible assembly at the distal end of the first extensible assembly, and the at least one yoke segment and the at least one array segment are movable from a stowed configuration to a deployed configuration, wherein, when the first extensible boom structure is in the deployed configuration, the at least one yoke segment is substantially aligned with the pitch axis and each array segment axis is substantially perpendicular to the pitch axis.

20. The spacecraft of claim 19, the spacecraft further comprising a rigid solar panel with a solar power-generating surface, wherein:

the rigid solar panel is mounted to one of the at least one yoke segment, and when the first extensible boom structure is mounted to the first side of the spacecraft and is in the stowed configuration, the solar power-generating surface faces away from the spacecraft.

21. The spacecraft of claim 19, further comprising a second extensible boom structure substantially the same as the first extensible boom structure wherein the proximal end of the first extensible assembly of the second extensible boom structure is rotatably connected with a second side of the spacecraft opposite the first side.

22. The spacecraft of claim 19, further comprising at least one rollable solar panel unit, wherein the at least one rollable solar panel unit:

includes a flexible solar power-generating element and a deployment spool configured to rotate about a roll-up axis of the rollable solar panel unit, is configured to deploy the flexible solar power-generating element along an extension axis substantially perpendicular to the roll-up axis, and is connected with one of the array segments such that the roll-up axis of the rollable solar panel unit is substantially parallel to the array segment axis of the array segment.

23. The spacecraft of claim 22, wherein the flexible solar power-generating element is:

wound around the deployment spool when the first extensible boom structure is in the stowed configuration, and substantially unwound from the deployment spool and extended along the extension axis in a direction substantially normal to the first side of the main body when the first extensible boom structure is in the deployed configuration.

24. The spacecraft of claim 19, wherein each second extensible assembly includes a plurality of array segments that:

are rotatably connected end-to-end, unfold in a concertinaed manner during movement from the stowed configuration to the deployed configuration, and are substantially in line with one another and arranged end-to-end in the deployed configuration.

* * * * *